(12) United States Patent
Jeong et al.

(10) Patent No.: US 10,803,868 B2
(45) Date of Patent: Oct. 13, 2020

(54) SOUND OUTPUT SYSTEM AND VOICE PROCESSING METHOD

(71) Applicant: SAMSUNG ELECTRONICS CO., LTD., Suwon-si, Gyeonggi-do (KR)

(72) Inventors: Kab Kyun Jeong, Suwon-si (KR); Deuk Hoon Lee, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 116 days.

(21) Appl. No.: 16/234,966

(22) Filed: Dec. 28, 2018

(65) Prior Publication Data

US 2019/0206403 A1    Jul. 4, 2019

(30) Foreign Application Priority Data

Dec. 28, 2017 (KR) .................. 10-2017-0182019

(51) Int. Cl.
*G10L 15/22* (2006.01)
*G10L 15/28* (2013.01)
*G06F 3/16* (2006.01)

(52) U.S. Cl.
CPC .............. *G10L 15/22* (2013.01); *G06F 3/167* (2013.01); *G10L 15/28* (2013.01); *G10L 2015/223* (2013.01)

(58) Field of Classification Search
USPC ....................................................... 704/251
See application file for complete search history.

(56) References Cited

U.S. PATENT DOCUMENTS 8,234,111 B2 * 7/2012 Lloyd .................. G10L 15/20
                                                      704/231
8,606,568 B1 * 12/2013 Tickner ............... G10L 15/1815
                                                      704/231
(Continued)

FOREIGN PATENT DOCUMENTS

JP    2012-064074    3/2012
KR    10-1506510    3/2015
(Continued)

OTHER PUBLICATIONS

Search Report and Written Opinion dated Apr. 24, 2019 in counterpart International Patent Application No. PCT/KR2018/016793.

*Primary Examiner* — Thuykhanh Le
(74) *Attorney, Agent, or Firm* — Nixon & Vanderhye, P.C.

(57) ABSTRACT

A sound output system includes a receiving apparatus comprising receiving circuitry configured to receive a user input; and a sound apparatus comprising circuitry configured to receive the user input from the receiving apparatus and perform an operation based on the user input received from the receiving apparatus. The sound apparatus may include a sound outputter comprising sound output circuitry; a first communicator comprising communication circuitry configured to communicate with the receiving apparatus; and a controller configured to control the sound apparatus to perform the operation based on a command received from the receiving apparatus through the first communicator. The receiving apparatus is removably attachable to the sound apparatus. The sound apparatus is configured to perform different operations depending on different attachment positions of the receiving apparatus, in response to the same user input.

20 Claims, 27 Drawing Sheets

(56) References Cited

U.S. PATENT DOCUMENTS

| | | | |
|---|---|---|---|
| 8,639,214 B1* | 1/2014 | Fujisaki | G06Q 20/32 |
| | | | 379/88.03 |
| 8,744,849 B2* | 6/2014 | Liao | G10L 15/20 |
| | | | 704/233 |
| 9,349,366 B2* | 5/2016 | Giancarlo | G10L 15/04 |
| 9,564,130 B2 | 2/2017 | Choi et al. | |
| 9,639,214 B2* | 5/2017 | Dunphy | G06F 3/044 |
| 9,721,586 B1* | 8/2017 | Bay | H04R 1/028 |
| 10,074,370 B2 | 9/2018 | Choi et al. | |
| 2006/0250358 A1* | 11/2006 | Wroblewski | H04N 5/44582 |
| | | | 345/157 |
| 2007/0139558 A1* | 6/2007 | Reineke | G11B 31/00 |
| | | | 348/571 |
| 2008/0053286 A1* | 3/2008 | Teicher | G10H 1/0083 |
| | | | 84/2 |
| 2009/0112589 A1* | 4/2009 | Hiselius | H04M 1/72544 |
| | | | 704/246 |
| 2009/0259467 A1* | 10/2009 | Sumiyoshi | G10L 17/00 |
| | | | 704/246 |
| 2011/0118700 A1* | 5/2011 | Remde | A61M 5/31525 |
| | | | 604/506 |
| 2011/0191108 A1* | 8/2011 | Friedlander | G09G 5/00 |
| | | | 704/270.1 |
| 2012/0266069 A1* | 10/2012 | Moshiri | H04N 21/4782 |
| | | | 715/719 |
| 2013/0325480 A1* | 12/2013 | Lee | G08C 23/04 |
| | | | 704/275 |
| 2013/0339019 A1* | 12/2013 | Giancarlo | G10L 15/1807 |
| | | | 704/251 |
| 2016/0011854 A1* | 1/2016 | Furumoto | G01C 21/3608 |
| | | | 704/249 |
| 2016/0163315 A1* | 6/2016 | Choi | H04L 41/22 |
| | | | 704/275 |
| 2017/0110126 A1 | 4/2017 | Choi et al. | |
| 2018/0164903 A1* | 6/2018 | Chu | G06F 3/03547 |
| 2018/0228006 A1* | 8/2018 | Baker | H05B 47/19 |
| 2019/0020493 A1* | 1/2019 | Arling | G06F 3/167 |
| 2019/0034075 A1* | 1/2019 | Smochko | G06F 3/04883 |
| 2019/0035398 A1 | 1/2019 | Choi et al. | |

FOREIGN PATENT DOCUMENTS

| | | |
|---|---|---|
| KR | 10-2016-0067025 | 6/2016 |
| KR | 10-2017-0036587 | 4/2017 |
| KR | 10-2017-0093629 | 8/2017 |
| WO | 2017/135531 | 8/2017 |

* cited by examiner

SOUND OUTPUT SYSTEM AND VOICE PROCESSING METHOD

CROSS-REFERENCE TO RELATED APPLICATION

This application is based on and claims priority under 35 U.S.C. § 119 to Korean Patent Application No. 10-2017-0182019, filed on Dec. 28, 2017 in the Korean Intellectual Property Office, the disclosure of which is incorporated by reference in its entirety.

TECHNICAL FIELD

The present disclosure relates generally to a sound output system and a voice recognizing method, and, for example, to a sound output system using artificial intelligence.

BACKGROUND

An artificial intelligence system may refer, for example, to a computer system that implements human-level intelligence. The artificial intelligence system is a system in which a machine learns and determines itself, and the recognition rate improves as the number of times using it increases.

An artificial intelligence technology may include a machine learning (deep learning) technology which use algorithms to classify/learn the characteristics of input data by themselves and elemental technologies that simulate functions such as recognition and judgment of a human brain by using machine learning algorithm.

The elemental technologies may include, for example, at least one of a linguistic understanding technology for recognizing human language/characters, a visual understanding technology for recognizing objects as human vision, deduction/prediction techniques for determining and logically deducting and predicting information, a knowledge representation technique for processing human experience information into knowledge data, and an operation control technology for controlling autonomous driving of a vehicle and a motion of a robot.

A voice recognition system may refer to a system that recognizes a user voice utterance and provides information or a service according to the user's intention based on the recognized utterance voice.

Until recently, the artificial intelligence system and the voice recognition system have been developed separately. In particular, the artificial intelligence system and the voice recognition system have been limited in performance by being provided individually as product units.

A voice recognition algorithm capable of processing natural language and an artificial intelligence algorithm capable of responding to natural language have a large data processing capacity to be processed by a processor. Therefore, a high-performance processor is required to mount the voice recognition algorithm for processing natural language and the artificial intelligence algorithm capable of responding to natural language, thereby increasing the price of an apparatus. As a result, many conventional voice recognition systems and artificial intelligence systems have remained at the level of processing simple commands of a user or responding to simple questions of the user.

SUMMARY

Therefore, various example embodiments of the present disclosure provide a sound output system including a receiving apparatus provided separately from a sound apparatus for performing voice recognition.

It is another example aspect of various embodiments of the present disclosure to provide a sound output system capable of performing voice recognition using a user apparatus having a high-performance processor or a conversation service server.

It is another example aspect of various embodiments of the present disclosure to provide a sound output system capable of performing a plurality of operations based on a user voice utterance.

It is another example aspect of various embodiments of the present disclosure to provide a sound output system capable of controlling a plurality of electronic devices based on a user voice utterance.

It is another example aspect of various embodiments of the present disclosure to provide a sound output system capable of controlling other electronic devices based on a position of a receiving apparatus that receives a user voice utterance.

Additional aspects of the disclosure will be set forth in part in the description which follows and, in part, will be apparent from the description.

In accordance with an example aspect of the present disclosure, a sound output system includes: a receiving apparatus comprising receiving circuitry configured to receive a user input; and a sound apparatus comprising circuitry configured to receive the user input from the receiving apparatus and to perform an operation in response to the user input received from the receiving apparatus. The sound apparatus may include a sound outputter comprising sound output circuitry; a first communicator comprising communication circuitry configured to communicate with the receiving apparatus; and a controller configured to control the sound apparatus to perform the operation based on the user input received from the receiving apparatus through the first communicator. The receiving apparatus may be removably attachable to the sound apparatus. The sound apparatus may perform different operations depending on different attachment positions of the receiving apparatus, in response to the same user input.

The user input may include a voice command. The receiving apparatus may transmit the voice command to the sound apparatus. The controller may recognize the voice command received from the receiving apparatus and control the sound apparatus to perform the operation based on the recognized voice command.

The sound apparatus may further include: a second communicator comprising communication circuitry configured to communicate with a user apparatus. The controller may control the second communicator to transmit the voice command to the user apparatus and receive the voice command recognized by the user apparatus from the user apparatus through the second communicator.

The sound apparatus may further include: a second communicator comprising communication circuitry configured to communicate with a plurality of electronic devices. The controller may control the second communicator to transmit the recognized voice command to at least one of the plurality of electronic devices.

The sound apparatus may further include: a second communicator comprising communication circuitry configured to communicate with a plurality of electronic devices. The controller may receive the voice command and information about the electronic device to which the receiving apparatus is attached through the first communicator and transmit the recognized voice command to the electronic device to which the receiving apparatus is attached through the second communicator.

The information about the electronic device to which the receiving apparatus is attached may include electrical properties and/or magnetic properties of the electronic device. The controller may identify the electronic device to which the receiving apparatus is attached by comparing the electrical properties and/or magnetic properties of the electronic device with the electrical properties and/or magnetic properties previously stored in a memory.

The user input may include a plurality of voice commands. The receiving apparatus may transmit the plurality of voice commands to the sound apparatus. The controller may recognize the plurality of voice commands received through the first communicator and control the sound apparatus to sequentially perform a plurality of operations based on the recognized plurality of voice commands.

The user input may include a voice command. The receiving apparatus may transmit the voice command to a user apparatus, receive the voice command recognized by the user apparatus from the user apparatus, and transmit the recognized voice command to the sound apparatus. The controller may control the sound apparatus to perform the operation based on the voice command received from the receiving apparatus.

In accordance with another example aspect of the present disclosure, a voice processing method includes: receiving, by a receiving apparatus, a user input; and performing, by a sound apparatus, an operation based on a command based on the user input received by the receiving apparatus, and wherein the receiving apparatus is removably attachable to the sound apparatus, and the performing of the operation comprises performing different operations depending on different attachment positions of the receiving apparatus, in response to the same user input.

The user input may include a voice command. The performing of the operation may include receiving the voice command from the receiving apparatus by the sound apparatus; recognizing the voice command received from the receiving apparatus; and performing the operation based on the recognized voice command.

The performing of the operation may include transmitting the voice command to a user apparatus by the sound apparatus; and performing the operation based on the voice command recognized by the user apparatus.

The performing of the operation may include transmitting the recognized voice command to at least one of a plurality of electronic devices by the sound apparatus.

The performing of the operation may include receiving information about an electronic device to which the receiving apparatus is attached by the sound apparatus and the voice command; and transmitting the recognized voice command to the electronic device to which the receiving apparatus is attached.

The information about the electronic device to which the receiving apparatus is attached may include electrical properties and/or magnetic properties of the electronic device. The method may further include: identifying, by the sound apparatus, the electronic device to which the receiving apparatus is attached by comparing the electrical properties and/or magnetic properties of the electronic device with electrical properties and/or magnetic properties previously stored in a memory.

The user input may include a plurality of voice commands. The performing of the operation may include receiving the plurality of voice commands from the receiving apparatus by the sound apparatus; recognizing the plurality of voice commands received from the receiving apparatus; and sequentially performing operations based on the recognized plurality of voice commands.

The user input may include a plurality of voice commands. The method may further include: transmitting, by the receiving apparatus, the voice command to a user apparatus; receiving the voice command recognized by the user apparatus from the user apparatus; transmitting the recognized voice command to the sound apparatus; and performing the operation based on the voice command received from the receiving apparatus by the sound apparatus.

In accordance with another example aspect of the present disclosure, a sound output system includes: a receiving apparatus comprising receiving circuitry configured to receive a user voice command; and a sound apparatus comprising circuitry configured to receive the user input from the receiving apparatus and to operate based on the user voice command received from the receiving apparatus. The receiving apparatus may include a microphone configured to receive the user voice command; a communicator comprising communication circuitry configured to communicate with the receiving apparatus; an attachment position detector comprising position detecting circuitry configured to collect information about a position to which the receiving apparatus is attached; and a controller configured to control the communicator to transmit the information about the position to which the receiving apparatus is attached and the user voice command to the sound apparatus.

The information about the position may include at least one of electrical properties and magnetic properties of the position to which the receiving apparatus is attached.

The attachment position detector may detect electrical properties and/or magnetic properties of the position to which the receiving apparatus is attached. The controller may identify the position to which the receiving apparatus is attached by comparing the electrical properties and/or magnetic properties with the electrical properties or magnetic properties previously stored in a memory.

The sound apparatus may perform different operations in response to the same user voice command according to different attachment positions to which the receiving apparatus is attached.

BRIEF DESCRIPTION OF THE DRAWINGS

The above and/or other aspects, features and attendant advantages of the present disclosure will become apparent and more readily appreciated from the following detailed description, taken in conjunction with the accompanying drawings, in which like reference numerals refer to like elements, and wherein.

DETAILED DESCRIPTION

Figure 1:
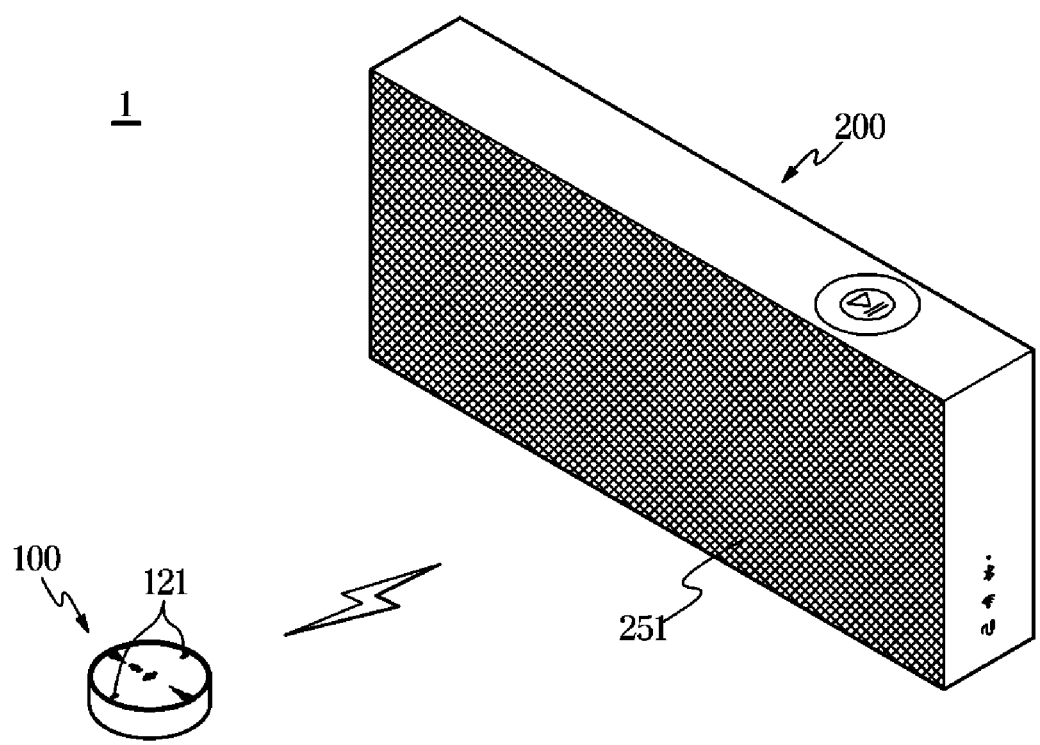
FIG. 1 is a diagram illustrating an example of a sound output system according to an embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, example embodiments will now be described more fully hereinafter with reference to the accompanying drawings. The example embodiments may, however, be embodied in many different forms and should not be construed as being limited to the embodiments set forth herein. These embodiments are provided so that this disclosure will be thorough and complete and will fully convey the example embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast; when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the example embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Hereinafter, various example embodiments of the present disclosure will be described in greater detail with reference to the accompanying drawings.

FIG. 1 is a diagram illustrating an example of a sound output system according to an embodiment.

Referring to FIG. 1, a sound output system 1 may include a receiving apparatus (e.g., including receiving circuitry) 100 for receiving a user voice utterance and a sound apparatus (e.g., including sound output circuitry) 200 for outputting a sound based on the user voice utterance.

The receiving apparatus 100 may include various receiving circuitry, such as, for example, and without limitation, a microphone 121 for receiving the user voice utterance. The receiving apparatus 100 may receive the user voice utterance (e.g., sound wave) using the microphone 121, and convert the utterance voice to voice data.

According to an embodiment, the receiving apparatus 100 may perform voice recognition on the voice data. For example, the receiving apparatus 100 may perform the voice recognition, and generate a control command based on a voice recognition result.

The receiving apparatus 100 may be carried by a user. For example, the user may move around carrying the receiving apparatus 100.

The receiving apparatus 100 may be attached to the sound apparatus 200. For example, the receiving apparatus 100 may be attached to various positions such as the top, front, rear, left, and right sides of the sound apparatus 200 using a fixing member such as, for example, and without limitation, a magnet. The receiving apparatus 100 may also identify (determine) positions (e.g., top, front, rear, left, and right sides) on the sound apparatus 200 to which the receiving apparatus 100 is attached according to magnetic properties (whether magnetic or not) and/or electrical properties (e.g., electrical resistance or the like) of the attached position.

The receiving apparatus 100 may generate another control command based on the voice recognition result and the position on the sound apparatus 200 to which the receiving apparatus 100 is attached. For example, even if the same voice is received from the user, the receiving apparatus 100 may generate another control command and transmit another control command to the sound apparatus 200 when the receiving apparatus 100 is attached at a different position.

The receiving apparatus 100 may be attached to another electronic device. For example, the receiving apparatus 100 may be attached to various electronic devices such as, for example, and without limitation, a television, a refrigerator, a washing machine, a microwave oven, or the like, using the fixing member such as the magnet. The receiving apparatus 100 may also identify the electronic device based on the magnetic properties (whether magnetic or not) and/or electrical properties (e.g., electrical resistance, etc.).

The receiving apparatus 100 may generate another control command based on the voice recognition result and the electronic device to which the receiving apparatus 100 is attached. For example, even if the same voice is received from the user, the receiving apparatus 100 may generate another control command and transmit another control command to the electronic device when the receiving apparatus 100 is attached at a different position.

The receiving apparatus 100 may generate different control commands based on the voice recognition result and the electronic apparatus to which the receiving apparatus 100 is attached. For example, even if the same voice is received from the user, the receiving apparatus 100 may generate another control command and transmit another control command to the electronic apparatus when the electronic device to which receiving apparatus 100 is attached is different.

In addition, the receiving apparatus 100 may determine the type of the attached electronic device based on the magnetic and/or electrical properties of the attached portion, and generate another control command based on the voice recognition result and the position where the receiving apparatus 100 is attached and the type of the electronic apparatus.

The receiving apparatus 100 may exchange data with the sound apparatus 200 by wire or wirelessly. The receiving apparatus 100 may transmit the voice data to the sound apparatus 200 by wire or wirelessly.

The sound apparatus 200 may include various sound output circuitry, such as, for example, and without limitation, a speaker 251 for outputting sound. The sound apparatus 200 may convert an electrical signal to sound through the speaker 251.

The sound apparatus 200 may communicate by wire or wirelessly with the receiving apparatus 100 and may receive the voice data by wire or wirelessly corresponding to the user voice utterance from the receiving apparatus 100.

The sound apparatus 200 may process the voice data to recognize the contents of the user voice utterance. In other words, the sound apparatus 200 may perform voice recognition on the sound data received from the receiving apparatus 100.

The sound apparatus 200 may output sound in response to the user voice utterance or may output a response voice in response to the user voice utterance.

The sound apparatus 200 may perform various operations based on the contents of the recognized user voice utterance. For example, the sound apparatus 200 may answer the user's question or output the information requested by the user.

The sound apparatus 200 may recognize a plurality of different control command(s) (questions or commands, etc.) included in a single user voice utterance and may perform a plurality of different operations in response to the plurality of different control command(s). For example, when the user utters the voice "play music at volume 10," the sound apparatus 200 may play music by executing a music playback application for playing the music to play the music and may control the output volume of the speaker 251 by executing a control application for controlling the output volume of the speaker 251.

Hereinafter, the receiving apparatus 100 and the sound apparatus 200 of the sound output system 1 will be described in greater detail below.

Figure 2:
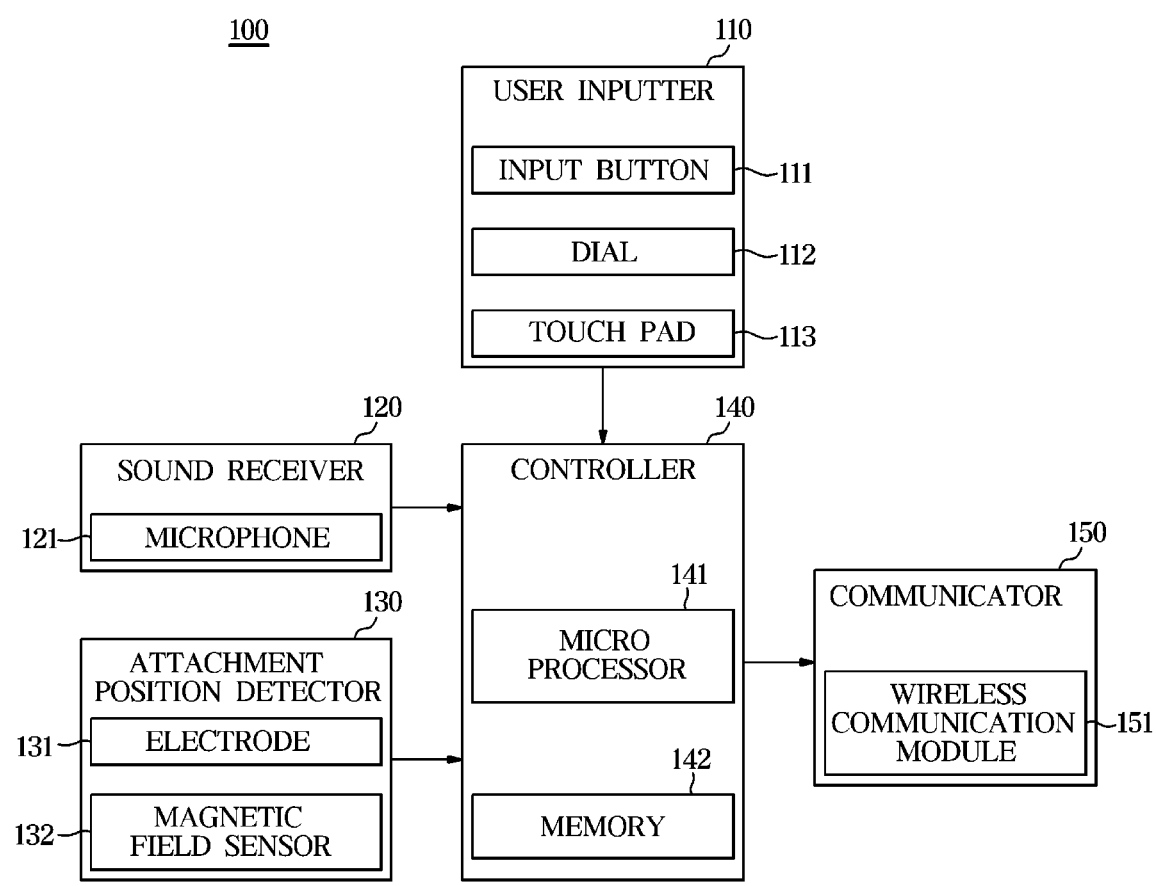
FIG. 2 is a block diagram illustrating an example configuration of a receiving apparatus according to an embodiment.
Figure 3A:
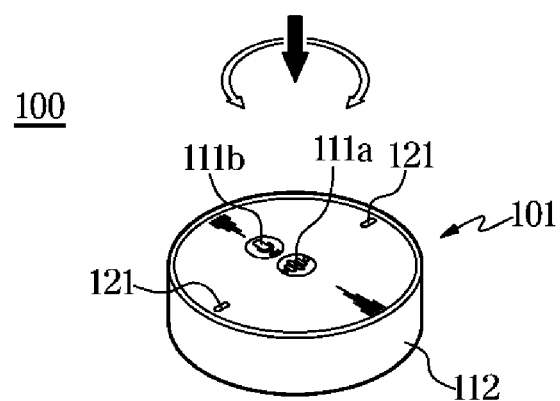
FIGS. 3A, 3B and 3C are diagrams illustrating an example of a user inputter of the receiving apparatus according to an embodiment.
Figure 3B:
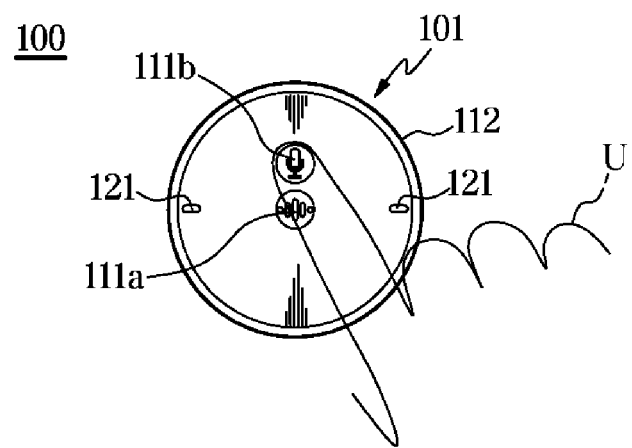
Figure 3C:
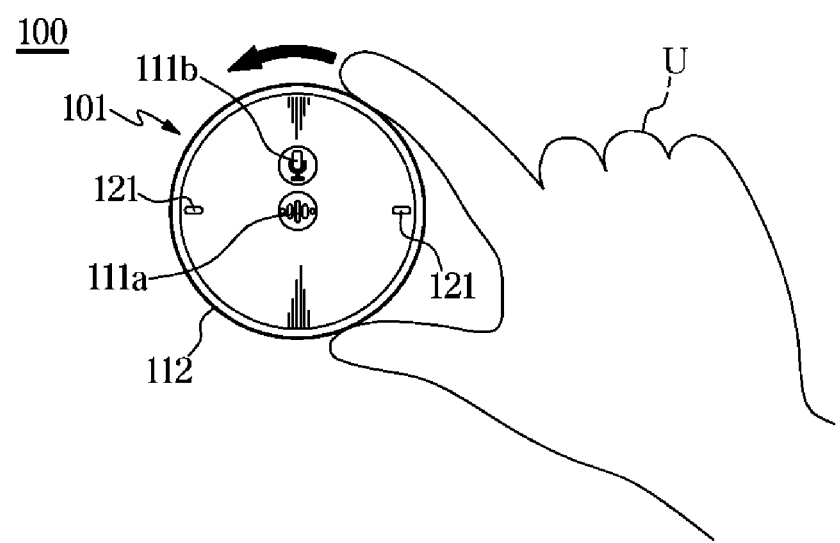
Figure 4A:
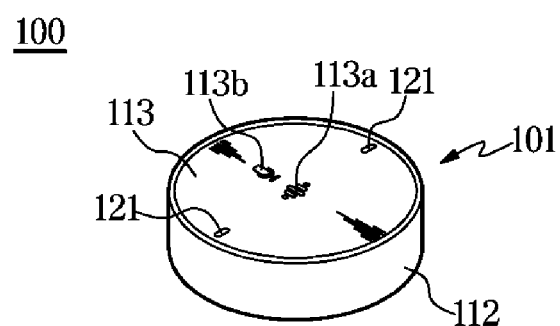
FIGS. 4A, 4B and 4C are diagrams illustrating another example of the user inputter of the receiving apparatus according to an embodiment.
Figure 4B:
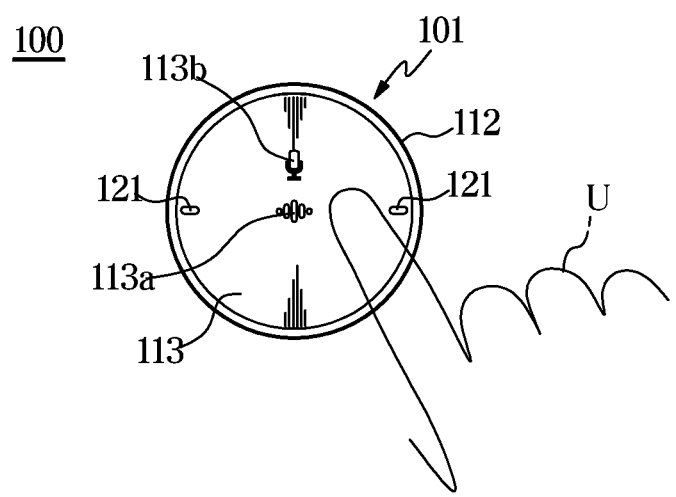
Figure 4C:
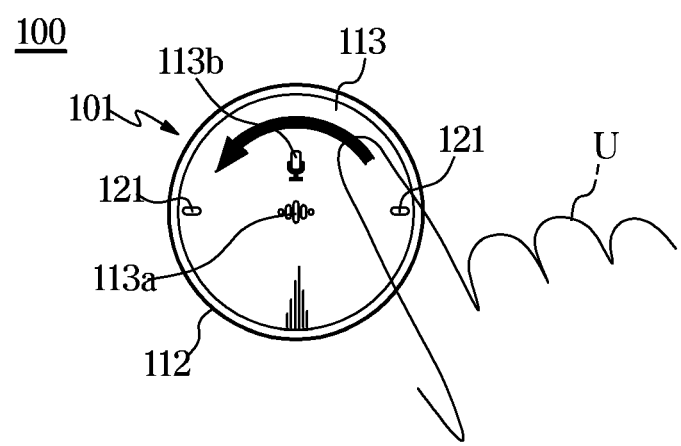
Figure 5A:
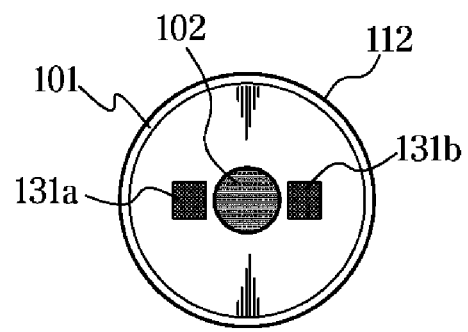
FIGS. 5A and 5B are diagrams illustrating an example of an attachment detector of the receiving apparatus according to an embodiment.
Figure 5B:
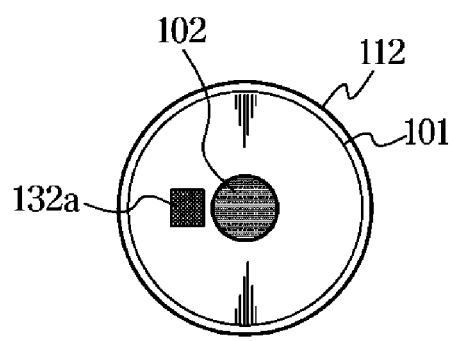

FIG. 2 is a block diagram illustrating an example configuration of a receiving apparatus according to an embodiment, FIGS. 3A, 3B and 3C are diagrams illustrating an example of a user inputter of the receiving apparatus according to an embodiment, FIGS. 4A, 4B and 4C are diagrams illustrating another example of the user inputter of the receiving apparatus according to an embodiment, and FIGS. 5A and 5B are diagrams illustrating an example of an attachment detector of the receiving apparatus according to an embodiment.

Referring to FIGS. 2, 3A, 3B, 3C, 4A, 4B, 4C, 5A and 5B, the receiving apparatus 100 may include a main body 101 and a fixing member (e.g., including a magnet) 102.

The main body 101 forms the appearance of the receiving apparatus 100 and may prevent and/or reduce the components of the receiving apparatus 100 from being exposed to the outside.

The bottom surface of the main body 101 may include the fixing member 102 for securing the receiving apparatus 100 to another electronic device. For example, the fixing member 102 may include, for example, and without limitation, a magnet that generates a magnetic field. The receiving apparatus 100 may be secured to the surface of a metallic material of another electronic device by the magnet.

The receiving apparatus 100 may include a user inputter (e.g., including user input circuitry) 110 for receiving a user input, a sound receiver (e.g., including sound receiving circuitry) 120 for receiving the user voice utterance, an attachment position detector (e.g., including position detecting circuitry) 130 for collecting information about the position where the receiving apparatus 100 is attached, a controller (e.g., including processing circuitry) 140 for processing a user input and the user voice utterance, and a communicator (e.g., including communication circuitry) 150 for communicating with the sound apparatus 200.

The user inputter 110 may include various input circuitry and receive the user input from the user and may transmit information about the user input to the controller 140. In addition, the controller 140 may transmit a command for controlling another electronic device to another electronic device according to the user input through the user inputter 110.

The user inputter 110 may include various input circuitry, such as, for example, and without limitation, an input button 111 and/or a dial 112 and/or a touch pad 113, or the like.

The input button 111 may, for example, be moved by a force exerted by the user and may receive a pre-assigned user input. The input button 111 may output an electrical signal corresponding to the assigned user input to the controller 140, and the controller 140 may perform an operation based on the user input.

The input button 111 may be provided on one side of the main body 101. For example, as illustrated in FIG. 3A, the input button 111 (see, e.g., FIG. 2) may be provided on the upper surface of the main body 101.

The user inputter 110 may, for example, include various kinds of the input buttons 111 assigned to various user inputs. For example, the user inputter 110 may include a music play button 111*a* for allowing the sound apparatus 200 to play music, a voice recognition start button 111b for activating voice recognition, and the like as illustrated in FIG. 3A. However, the input button 111 is not limited to that illustrated in FIG. 3A, and various kinds of the input buttons 111 for receiving various user inputs may be provided.

When the user presses the input button 111 vertically, the input button 111 moves in a direction in which the user presses and the user inputter 110 may receive the user input assigned to the input button 111. For example, when the user presses the voice recognition start button 111b as illustrated in FIG. 3B, the voice recognition start button 111b is moved by the user's manipulation and the user inputter 110 may receive a voice recognition start command assigned to the voice recognition start button 111b.

However, the start of voice recognition is not limited to the voice recognition start button 111b. For example, the receiving apparatus 100 may receive a voice recognition initiation language (e.g., utterance of "sound apparatus") for starting voice recognition through the microphone 121 and may start the voice recognition in response to the voice recognition initiation language.

The dial 112 may, for example, be rotated by a force applied from the user, and may receive the pre-assigned user input (control command) according to the rotation angle. The dial 112 may also output to the controller 140 an electrical signal corresponding to the pre-assigned user input.

The dial 112 may be provided on one side of the main body 101. For example, as illustrated in FIG. 3A, the dial 112 may be provided on the side surface of the main body 101.

The dial 112 may be adapted to receive continuously increasing or continuously decreasing physical quantities from the user. For example, the dial 112 may be provided to control the output volume of the sound output from the sound apparatus 200.

When the user rotates the dial 112, the dial 112 may rotate in the direction that the user rotates, and the user inputter 110 may receive the assigned user input according to the angle at which the dial 112 rotates. For example, as illustrated in FIG. 3C, when the user rotates the dial 112 to control the volume, the dial 112 may be rotated by the user's manipulation, and the user inputter 110 may receive a volume description command corresponding to the rotation angle of the dial 112.

The touch pad 113 may receive the user input by touch. The touch pad 113 may detect the touch coordinates by the user and output information about the touch coordinates to the controller 140.

The touch pad 113 may be provided on one side of the main body 101. For example, as illustrated in FIG. 4A, the touch pad 113 may be provided on the upper surface of the main body 101.

The touch pad 113 may receive the user input based on a touch position of the user. The touch pad 113 may include a plurality of areas, and different user inputs may be assigned to the respective areas.

For example, when the user touches a music playback area 113a of the touch pad 113, the user inputter 110 may receive the control command so that the sound apparatus 200 plays music as illustrated in FIG. 4B. Also, when the user touches a voice recognition start area 113b of the touch pad 113, the user inputter 110 may receive the voice recognition start command assigned to the voice recognition start area 113b.

The touch pad 113 may receive the user input based on the user's touch motion. The touch motion may indicate moving the touch position maintaining the touch of the touch pad 113 after the user touches the touch pad 113.

The touch pad 113 may receive various touch motions, and different user inputs may be allocated based on the touch motions in advance. For example, as illustrated in FIG. 4C, when the user rotates the touch position, the user inputter 110 may receive the volume description command corresponding to the rotational movement of the touch position. When the user rotates the touch position clockwise, the user inputter 110 may receive a volume up command. When the user rotates the touch position counterclockwise, the user inputter 110 may receive a volume down command.

The sound receiver 120 may receive the user voice utterance and output an electrical signal corresponding to the voice utterance to the controller 140.

The sound receiver 120 may include the microphone 121 that receives sound and outputs the electrical signal. The microphone 121 may collect the sound such as the user voice utterance, convert the sound into an electric signal, and transmit the electric signal to the controller 140.

The microphone 121 may be provided on one side of the main body 101. For example, as illustrated in FIG. 3A and FIG. 4A, the microphone 121 may be provided on the upper surface of the main body 101.

The attachment position detector 130 may include various position detecting circuitry, such as, for example, and without limitation, an electrode 131 for collecting electrical properties such as the electrical resistance of one side of the electronic device to which the receiving apparatus 100 is attached and a magnetic field sensor 132 for collecting magnetic properties of one side of the electronic device.

The electrode 131 may collect electrical properties of the electronic device to which the receiving apparatus 100 is attached, for example, information for determining the electrical conductivity and/or electrical resistance value.

For example, the electrode 131 may include a pair of electrodes 131a and 131b provided on the bottom surface of the main body 101 as illustrated in FIG. 5A. Also, the pair of electrodes 131a and 131b may contact the electronic device when the receiving apparatus 100 is secured to the electronic device.

The pair of electrodes 131a and 131b may be disposed at one side rather than the center and the center of the receiving apparatus 100 and may determine the electrical properties of the attachment position through contact with the electronic device to which the receiving apparatus 100 is attached. The controller 140 may transmit different control commands to the electronic device according to the electrical properties of the attachment position. In other words, the controller 140 may transmit another control command to be transmitted to the electronic device when the attachment position of the receiving apparatus 100 is different even if a voice command is the same.

The controller 140 may apply a voltage between the pair of electrodes 131a and 131b. When the voltage is applied between the pair of electrodes 131a and 131b, the current may flow through the pair of electrodes 131a and 131b and the electronic device. The controller 140 may measure the current value flowing through the pair of electrodes 131a and 131b and the electronic device. In addition, the controller 140 may determine the electrical properties such as the electrical conductivity and/or electrical resistance of the electronic device based on the current value flowing through the pair of electrodes 131a and 131b.

For example, the controller 140 may identify the electronic device to which the receiving apparatus 100 is attached based on the electrical properties of the electronic device. For example, the controller 140 may store the electrical properties of the previously collected electronic device in a memory 142 and may compare the electrical properties detected by the attachment position detector 130 and the electrical properties stored in the memory 142. The controller 140 may identify the electronic device to which the receiving apparatus 100 is attached based on the result of the comparison between the detected electrical properties and the stored electrical properties.

The magnetic field sensor 132 may collect information to determine whether the magnetic properties of the electronic device to which the receiving apparatus 100 is attached, for example, a magnetic body or a non-magnetic body.

For example, the magnetic field sensor 132 may include a Hall sensor 132*a* installed on the bottom surface of the main body 101 as illustrated in FIG. 5B. In addition, the Hall sensor 132*a* may contact the electronic device when the receiving apparatus 100 is secured to the electronic device.

The receiving apparatus 100 may be attached to the electronic device by the magnet, which may, for example, and without limitation, correspond to the fixing member 102. When the electronic device is a magnetic body, a magnetic field is formed in the electronic device by the magnetic field of the magnet, and the Hall sensor 132*a* may detect the magnetic field formed in the electronic device. On the other hand, when the electronic device is a non-magnetic body, a magnetic field is not formed in the electronic device, and the Hall sensor 132*a* may not detect the magnetic field. The Hall sensor 132*a* may output the detection result of the magnetic field to the controller 140.

The controller 140 may determine the magnetic properties of the electronic device based on the output of the Hall sensor 132*a*. The controller 140 may identify the electronic device to which the receiving apparatus 100 is attached based on the magnetic properties of the electronic device. For example, the controller 140 may store previously collected magnetic properties of the electronic device in the memory 142 and may compare the magnetic properties detected by the attachment position detector 130 and the magnetic properties stored in the memory 142. The controller 140 may identify the electronic device to which the receiving apparatus 100 is attached based on the result of the comparison between the detected magnetic properties and the stored magnetic properties.

The controller 140 may receive the signal from the user inputter 110, the signal from the sound receiver 120 and the signal from the attachment position detector 130 and may transmit the sound data to the communicator 150.

The controller 140 may determine the user input (e.g., control command) based on the signal from the user inputter 110. For example, the controller 140 may receive an electrical signal from the input button 111 and/or the dial 112 and/or the touch pad 113 and may determine the user input based on the received electrical signal. The controller 140 may control the communicator 150 to transmit the user input to the sound apparatus 200.

The controller 140 may receive the user voice utterance from the sound receiver 120. The controller 140 may receive the electrical signal from the microphone 121 and convert the electrical signal into voice data. The controller 140 may transmit the voice data to the communicator 150 to transmit the voice data to the sound apparatus 200. In addition, according to an embodiment, the controller 140 may perform the voice recognition on the voice data and generate the control command based on the voice recognition result.

The controller 140 may receive information about the electrical properties and/or magnetic properties of the electronic device to which the receiving apparatus 100 is attached from the attachment position detector 130 and identify the electronic device to which the receiving apparatus 100 is attached. For example, the controller 140 may determine the electrical properties of the electronic device based on the output of the electrode 131, and may identify the electronic device to which the receiving apparatus 100 is attached based on the electrical properties of the electronic device. In addition, the controller 140 may determine the magnetic properties of the electronic device based on the signal of the Hall sensor 132*a*, and may identify the electronic device to which the receiving apparatus 100 is attached based on the magnetic properties of the electronic device. Also, according to an embodiment, the controller 140 may generate different control commands according to the voice recognition result and the position where the receiving apparatus 100 is attached. For example, even if the voice received from the user is the same, the controller 140 may generate another control command when the receiving apparatus 100 is attached at the different position.

The controller 140 may include various processing circuitry, such as, for example, and without limitation, a microprocessor 141 and the memory 142. The controller 140 may be embodied in hardware, such as the microprocessor 141 and the memory 142, and software, such as programs and data stored in the memory 142 or any combinations thereof.

The memory 142 may store programs and data for controlling the components included in the receiving apparatus 100 and temporarily store data generated while controlling the components included in the receiving apparatus 100.

The memory 142 may store programs and data for processing the user voice utterance received by the sound receiver 120. The memory 142 may temporarily store data generated while processing the user voice utterance.

The memory 142 may include, for example, and without limitation, non-volatile memory, such as Read Only Memory (ROM) or flash memory, to store data for a long period of time and volatile memory, such as Static Random Access Memory (S-RAM) or Dynamic Random Access Memory (D-RAM), to temporarily store data.

The microprocessor 141 may include various processing circuitry and generate a control signal for controlling the communicator 150 based on the user input from the user inputter 110 and/or the user voice utterance from the sound receiver 120.

The microprocessor 141 may convert the user voice utterance into voice data based on the programs and data stored in the memory 142 in response to the reception of the voice recognition initiation command through the user inputter 110. The microprocessor 141 may generate a control signal for controlling the communicator 150 to transmit the voice data to the sound apparatus 200.

The microprocessor 141 may include an operation circuit to perform logic operations and arithmetic operations, a memory circuit to store computed data, and the like.

The operation of the controller 140 is described in greater detail below. In addition, the operation of the receiving apparatus 100, which will be described below, may be interpreted as the control operation of the controller 140.

The communicator 150 may include various communication circuitry and exchange data with the sound apparatus 200 by wire or wirelessly.

The communicator 150 may include various communication circuitry included in various modules, including, for example, and without limitation, a wireless communication module 151 including various circuitry for wirelessly transmitting the voice data transmitted from the controller 140 to the sound apparatus 200.

The wireless communication module 151 may exchange data directly with the sound apparatus 200 or exchange data with the sound apparatus 200 through an access point AP.

The wireless communication module 151 may exchange data with the sound apparatus 200 using a wireless communication technology standard such as Wi-Fi (WiFi™, IEEE 802.11 technology standard), Bluetooth (Bluetooth™, IEEE 802.15.1 technology standard), or ZigBee (ZigBee™, IEEE 802.15.4 technology standard).

The wireless communication module 151 may emit a wireless signal including the voice data to free space through an antenna to transmit the voice data to the sound apparatus 200. The wireless communication module 151 may receive the wireless signal of the sound apparatus 200 from the free space through the antenna.

As described above, the receiving apparatus 100 may be carried by the user or attached to the electronic device, receive the user voice utterance, and transmit the voice data corresponding to the utterance voice to the sound apparatus 200. When the receiving apparatus 100 is attached to the electronic device, the receiving apparatus 100 may identify the electronic device using the electrical properties and/or magnetic properties of the electronic device.

Figure 6:
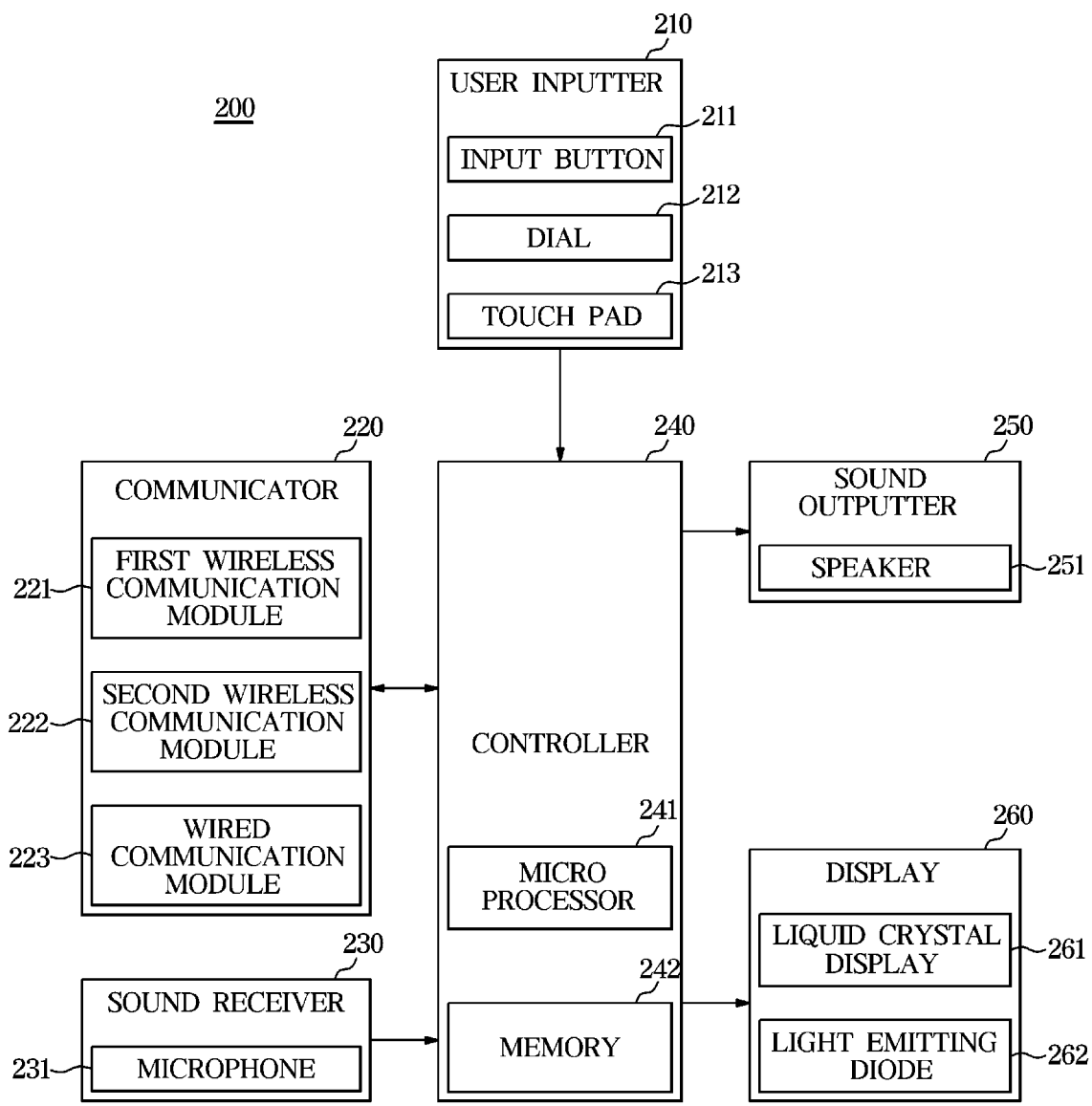
FIG. 6 is a block diagram illustrating an example configuration of a sound apparatus according to an embodiment.
Figure 7:
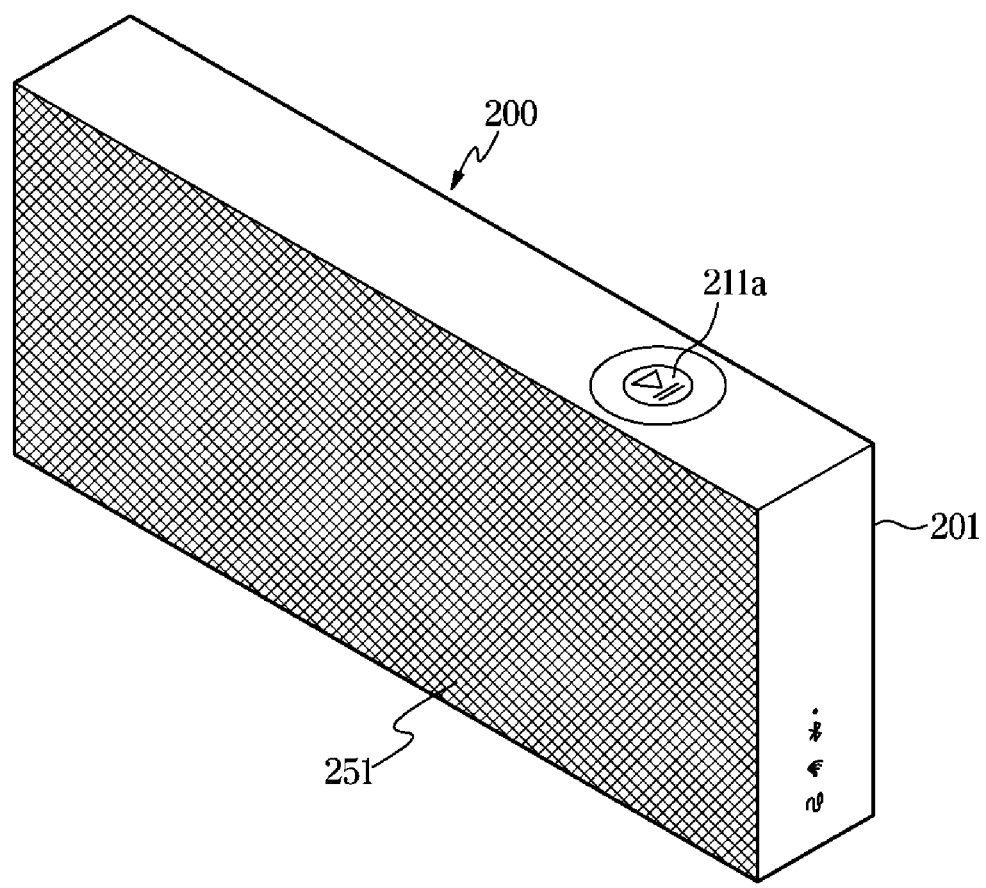
FIG. 7 is a diagram illustrating an appearance of an example sound apparatus according to an embodiment.

FIG. 6 is a block diagram illustrating an example configuration of a sound apparatus according to an embodiment and FIG. 7 is a diagram illustrating an appearance of the sound apparatus according to an embodiment.

Referring to FIGS. 6 and 7, the sound apparatus 200 may include a main body 201.

The main body 201 forms an appearance of the sound apparatus 200 and may prevent components of the sound apparatus 200 from being exposed to the outside.

The sound apparatus 200 may include a user inputter (e.g., including input circuitry) 210 for receiving the user input, a communicator (e.g., including communication circuitry) 220 for communicating with the receiving apparatus 100, a sound receiver (e.g., including sound receiving circuitry) 230 for receiving the user voice utterance, a controller (e.g., including processing circuitry) 240 for performing voice recognition (speech recognition), a sound outputter (e.g., including sound output circuitry) 250 for outputting sound, and a display 260 for displaying operation information of the sound apparatus 200.

The user inputter 210 may include various input circuitry and receive the user input from the user and may transmit information about the user input to the controller 240.

The user inputter 210 may include various input circuitry, such as, for example, and without limitation, an input button 211 and/or a dial 212 and/or a touch pad 213, or the like.

The input button 211 may, for example, be moved by a force exerted by the user and may receive a pre-assigned user input. The input button 211 may transmit an electrical signal corresponding to the assigned user input to the controller 240.

The input button 211 may be provided on one side of the main body 201. For example, as illustrated in FIG. 7, the input button 211 may be provided on the upper surface of the main body 201.

The user inputter 210 may include various types of the input buttons 211 assigned to various user inputs. For example, the user inputter 210 may include a music play button 211*a* for allowing the sound apparatus 200 to play music.

The operation of the input button 211 may be the same as or similar to the operation of the input button 111 of the receiving apparatus 100 illustrated in FIG. 2.

The dial 212 may be rotated by a force applied from the user, and may receive the pre-assigned user input based on the rotation angle. The dial 212 may also transmit to the controller 240 the electrical signal corresponding to the pre-assigned user input.

The dial 212 may be provided on one side of the main body 201. For example, the dial 212 may be provided on the upper surface or the side surface of the main body 201.

The dial 212 may be provided to adjust the output volume of the sound output from the sound outputter 250.

The operation of the dial 212 may be the same as or similar to the operation of the dial 112 of the receiving apparatus 100 illustrated in FIG. 2.

The touch pad 213 may receive the user input by touch. The touch pad 213 may detect touch coordinates by the user and may transmit information on the touch coordinates to the controller 240.

The touch pad 213 may be provided on one side of the main body 201. For example, the touch pad 213 may be provided on the upper surface or the side surface of the main body 201.

The touch pad 213 may receive the user input based on the touch position of the user, or may receive the user input according to a touch motion of the user.

The operation of the touch pad 213 may be the same as or similar to the operation of the touch pad 113 of the receiving apparatus 100 illustrated in FIG. 2.

The communicator 220 may include various communication circuitry and exchange data with the receiving apparatus 100 and other electronic devices by wire or wirelessly.

The communicator 220 may include various communication circuitry included in various communication modules, such as, for example, and without limitation, a first wireless communication module 221 for wirelessly receiving the voice data from the receiving apparatus 100, a second wireless communication module 222 for wirelessly connecting to a communication network, and a wired communication module 223.

The first wireless communication module 221 may include various wireless communication circuitry and exchange data directly with the receiving apparatus 100 and/or exchange data with the receiving apparatus 100 through the access point AP.

The first wireless communication module 221 may exchange data with the receiving apparatus 100 using the wireless communication technology standard such as Wi-Fi, Bluetooth or ZigBee, or the like, but is not limited thereto.

The first wireless communication module 221 may receive the wireless signal including the voice data from the free space through the antenna to receive the voice data to the receiving apparatus 100. The first wireless communication module 221 may receive the wireless signal through the antenna to the free space.

The second wireless communication module 222 may include various wireless communication circuitry and wirelessly connect to the communication network and exchange data with other electronic devices connected to the communication network. For example, the second wireless communication module 222 may be connected to the communication network using the wireless communication technology standard such as Wi-Fi, Bluetooth or ZigBee, or the like, but is not limited thereto.

The communication network may include both wired and wireless communication networks. The wired communication network may include a communication network such as, for example, and without limitation, a cable network or a telephone network, or the like, and the wireless communication network may include a communication network for transmitting and receiving signals through radio waves. The wireless communication network may include the access point AP relaying the wired communication network and the wireless communication network.

The wired communication module 223 may include various wired communication circuitry and connect to the communication network by wire and exchange data with other electronic devices connected to the communication network. For example, the wired communication module 223 may be connected to the wired communication network through a wired communication technology standard such as Ethernet (IEEE 802.3 technical standard), but is not limited thereto.

The sound receiver 230 may include various sound receiving circuitry and receive the user voice utterance and transmit the electrical signal corresponding to the utterance voice to the controller 240.

The sound receiver 230 may include various sound receiving circuitry, such as, for example, and without limitation, a microphone 231 that receives sound and converts the received sound into an electrical signal. In addition, the microphone 231 may transmit the converted electrical signal to the controller 240.

The microphone 231 may be provided on one side of the main body 201. For example, the microphone 231 may be provided on the upper surface of the main body 201.

The controller 240 may receive the signal from the user inputter 210, the signal from the communicator 220 and the signal from the sound receiver 230 and may transmit the sound signal to the sound outputter 250.

The controller 240 may determine the user input (e.g., control command) based on the signal from user inputter 210. The controller 240 may receive the user input received through the communicator 220. In addition, the controller 240 may control the sound outputter 250 and/or the display 260 according to the user input. For example, the output volume of the sound outputter 250 may be controlled or an image displayed on the display 260 may be changed.

The controller 240 may receive the voice data through the communicator 220. The controller 240 may perform the voice recognition on the voice data received from the receiving apparatus 100. Further, the controller 240 may synthesize a response voice in response to the user voice utterance recognized by the voice recognition, and output the synthesized voice through the sound outputter 250.

For example, the controller 240 may perform the voice recognition for the voice data by pre-processing the voice data, extracting voice features from the voice data, comparing the voice features to voice models, and analyzing the meaning of the voice. The controller 240 may perform voice synthesis by synthesizing the voice for a response and post-processing the synthesized voice. The controller 240 may perform the voice recognition to recognize the user voice utterance and may control the operation of the sound apparatus 200 in response to the control command(s) recognized by the voice recognition. For example, the controller 240 may control the sound outputter 250 to output the sound in response to the control command(s) recognized by the voice recognition, or may control the display 260 to emit light or display the image.

The controller 240 may receive the user voice utterance from the sound receiver 230. For example, the controller 140 may receive the electrical signal from the microphone 231 and convert the electrical signal to voice data. Then, the controller 240 may perform the voice recognition on the voice data as well as the voice data received through the communicator 220, and output the response voice in response to the user voice utterance recognized by the voice recognition. In other words, the sound apparatus 200 may talk with the user.

The controller 240 may control the sound outputter 250 to output sound in response to the control command(s) recognized by the voice recognition or may control the display unit to emit the light or display the image. In other words, the sound apparatus 200 may operate according to a user voice command.

The controller 240 may include various processing circuitry, such as, for example, and without limitation, a microprocessor 241 and a memory 242. The controller 240 may be embodied in hardware, such as the microprocessor 241 and the memory 242, and software, such as programs and data stored in the memory 242, or any combination thereof.

The memory 242 may store programs and data for controlling the components included in the sound apparatus 200 and temporarily store data generated while controlling the components included in the sound apparatus 200.

The memory 242 may store the voice data received through the communicator 220 and/or programs and data for processing the user voice utterance received by the sound receiver 230. The memory 242 may also temporarily store data generated while processing the voice data and/or the user voice utterance.

The memory 242 may store various application programs for implementing various functions of the sound apparatus 200. For example, the memory 242 may store an operating system (OS) for managing hardware resources and software resources of the sound apparatus 200, a music playback application for playing music, and the like.

The memory 242 may include, for example, and without limitation, non-volatile memory, such as ROM or flash memory, to store data for a long period of time, and volatile memory, such as S-RAM and D-RAM, to temporarily store data.

The microprocessor 241 may include various processing circuitry and generate a control signal for controlling the sound outputter 250 and/or the display 260 based on the user input from the user inputter 210 and/or the voice data from the communicator 220 and/or the user voice utterance from the sound receiver 230.

The microprocessor 241 may recognize the user voice utterance according to programs and data stored in the memory 242 in response to the reception of the voice recognition initiation command through the user inputter 210 and/or the communicator 220 and/or the sound receiver 230, and synthesize the voice signal to respond to the user voice utterance recognized by the voice recognition. The microprocessor 241 may also generate the control signal for controlling the sound outputter 250 and/or the display 260 in response to the control command(s) recognized by the voice recognition.

The microprocessor 241 may include, for example, and without limitation, the operation circuit to perform logic operations and arithmetic operations, a memory circuit to store computed data, and the like.

The operation of the controller 240 is described in greater detail below. In addition, the operation of the sound apparatus 200 to be described below may include the control operation of the controller 240.

The sound outputter 250 may include various sound output circuitry and receive the electrical signal corresponding to the output sound from the controller 240 and convert the electrical signal to output sound. The controller 240 may synthesize a response sound according to the user voice utterance and output the electrical signal corresponding to the response sound to the sound outputter 250. The sound outputter 250 may output the response sound.

The sound outputter 250 may include various sound output circuitry, such as, for example, and without limitation, the speaker 251 that receives the electric signal and outputs the sound. The speaker 251 may receive the electrical signal from controller 240 and convert the electrical signal to sound.

The speaker 251 may be provided on one side of the main body 201. For example, as illustrated in FIG. 7, the speaker 251 may be provided on the side surface of the main body 201.

The display 260 may output an optical signal based on the control signal of the controller 240. For example, the display 260 may emit light or display the image according to the control signal of the controller 240.

The display 260 may include various type of displays, such as, for example, and without limitation, a liquid crystal display (LCD) and/or a light emitting diode (LED), or the like.

As described above, the sound apparatus 200 may receive the voice data from the receiving apparatus 100 and may perform the voice recognition on the voice data. The sound apparatus 200 may also output the response voice in response to the user voice utterance recognized by the voice recognition or may also control the operation of the sound outputter 250 and/or the display 260 in response to the control command(s) recognized by the voice recognition.

In the above description, the receiving apparatus 100 may receive the user voice utterance and the sound apparatus 200 may perform the voice recognition on the user voice utterance. However, the present disclosure is not limited thereto. For example, the receiving apparatus 100 may receive the user voice utterance and then perform the voice recognition on the user voice utterance, and the sound apparatus 200 may operate based on the recognized user voice utterance.

Hereinafter, the operation of the sound output system 1 including the receiving apparatus 100 and the sound apparatus 200 will be described in greater detail.

Figure 8:
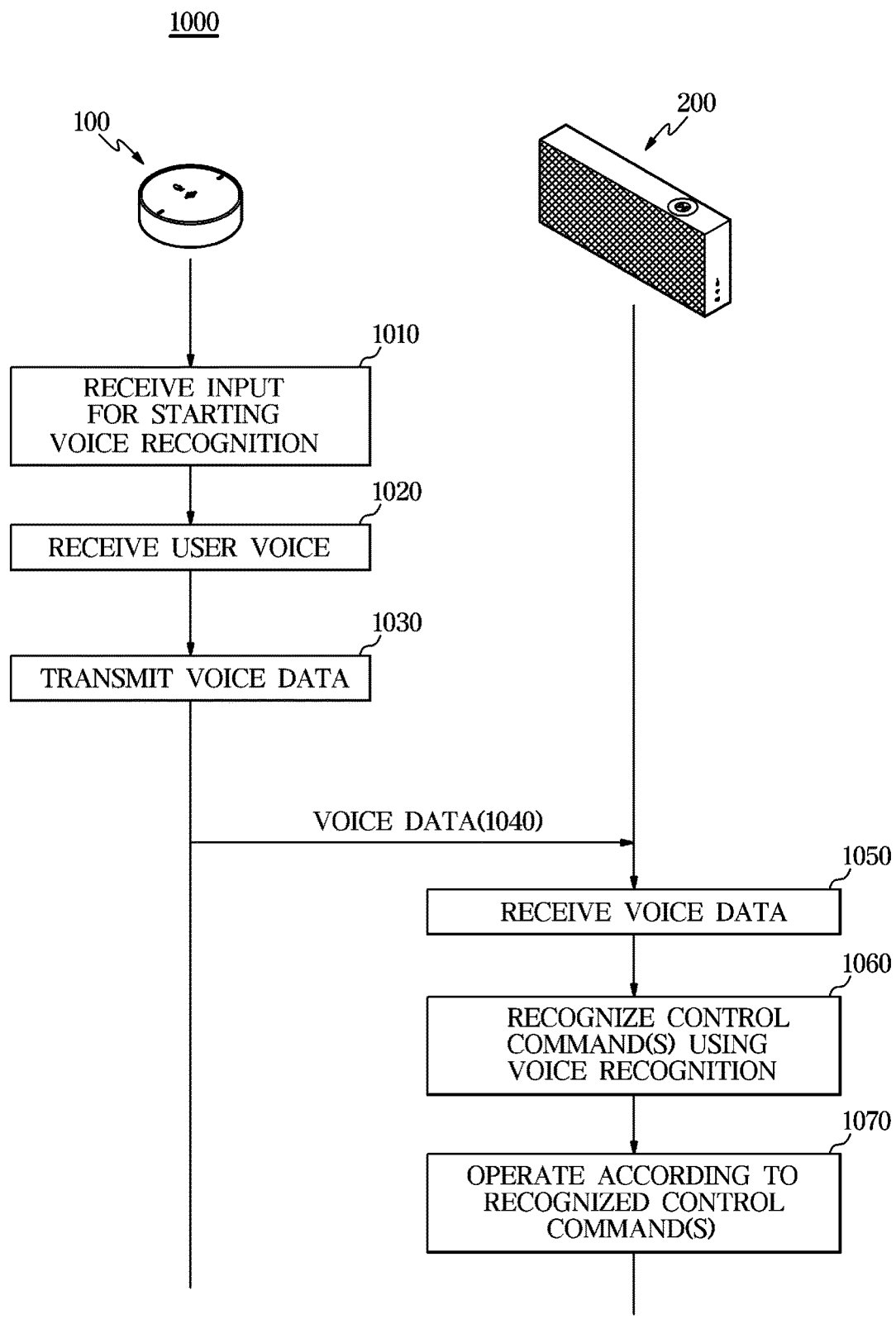
FIG. 8 is a sequence diagram illustrating an example voice recognition operation of the sound output system illustrated in FIG. 1.

FIG. 8 is a sequence diagram illustrating an example voice recognition operation of the sound output system 1 illustrated in FIG. 1.

With reference to FIG. 8, the voice recognition operation (1000) of the sound output system 1 is described.

The receiving apparatus 100 may receive an input for starting the voice recognition from the user (1010).

The receiving apparatus 100 may, for example, receive the user input for starting the voice recognition through the user inputter 110 or may receive the user voice utterance (hereinafter referred to as 'voice recognition initiation language') for starting the voice recognition through the sound receiver 120.

The user inputter 110 may include, for example, the voice recognition start button 111b for initiating the voice recognition. When the voice recognition start button 111b is pressed by the user while the voice recognition is deactivated, the receiving apparatus 100 may start reception of the user voice utterance for the voice recognition.

While the voice recognition is deactivated, the sound receiver 120 may receive the sound and transmit the received sound to the controller 140. The controller 140 may compare a preset voice recognition initiation language for starting the voice recognition with the sound received by the sound receiver 120 in a standby mode (low power mode). When the voice recognition initiation language is received from the user, the controller 140 may be switched to an active mode (normal mode) and may receive the user voice utterance and convert the user voice utterance into voice data in the active mode.

For example, a user U may be located away from the sound apparatus 200 and adjacent to the receiving apparatus 100. The user U may utter the voice recognition initiation language so that the sound output system 1 activates the voice recognition. The user U may utter "sound apparatus" so that the receiving apparatus 100 receives the user voice utterance and the sound apparatus 200 activates the voice recognition. In response to the voice recognition initiation language of the user U, the receiving apparatus 100 may start reception of the user voice utterance.

The receiving apparatus 100 may receive the user voice utterance from the user (1020).

After receiving the voice, the receiving apparatus 100 may receive the user voice utterance from the user through the sound receiver 120. In addition, the sound receiver 120 may convert the user voice utterance to an electrical signal and transmit the electrical signal to the controller 140. The controller 140 may receive the electrical signal from the sound receiver 120 and convert the electrical signal to the voice data.

For example, the user U may utter the control command for controlling the operation of the sound output system 1 after uttering "sound apparatus," which is the voice recognition initiation language. The user U may utter "raise the volume" to increase the output volume. The receiving apparatus 100 may receive the user voice utterance as "play the music and raise the volume" and convert the user voice utterance into voice data.

The receiving apparatus 100 may transmit the voice data to the sound apparatus 200 (1030).

The controller 140 may control the communicator 150 to transmit the voice data to the sound apparatus 200.

The communicator 150 may wirelessly transmit the voice data transmitted from the controller 140 to the sound apparatus 200. For example, the communicator 150 may emit the wireless signal including the voice data to the free space through the antenna to transmit the voice data to the sound apparatus 200. For example, the receiving apparatus 100 may wirelessly transmit the voice data indicating "play the music and raise the volume," which is the user voice utterance to the sound apparatus 200.

The voice data may be transmitted from the receiving apparatus 100 through the free space to the sound apparatus 200 (1040).

The sound apparatus 200 may receive the voice data from the receiving apparatus 100 (1050).

The communicator 220 may wirelessly receive the voice data transmitted from the receiving apparatus 100. For example, the receiving apparatus 100 may receive the wireless signal including the voice data from the free space through the antenna to receive the voice data. For example, the sound apparatus 200 may wirelessly receive from the receiving apparatus 100 the voice data indicating "play the music and raise the volume," which is the user voice utterance.

The communicator 220 may also communicate the voice data received from the receiving apparatus 100 to the controller 240.

The sound apparatus 200 may recognize the control command(s) based on the user voice utterance from the voice data using voice recognition (1060).

The controller 240 may extract a voice feature from the voice data and compare the voice feature with a previously stored voice model. The controller 240 may determine the meaning of the user voice utterance by comparing the voice feature of the voice data with the voice model.

For example, the controller 240 may perform the voice recognition on the voice data indicating "play the music and raise the volume." The controller 240 may determine the control command for playing the music and the control command for increasing the sound output volume by the voice recognition.

The sound apparatus 200 may operate in accordance with the control command(s) recognized by the voice recognition (1070).

The controller 240 may control the operation of the sound outputter 250 and/or the display 260 based on the control command(s) recognized by the voice recognition. In other words, the sound apparatus 200 may operate according to the user voice command. For example, the controller 240 may recognize a music playback command and the volume up command. The controller 240 may execute the music playback application and play music. In addition, the controller 240 may increase the output volume of the sound outputter 250 through the operating system.

The sound apparatus 200 may recognize a plurality of control commands from the voice data. Also, the sound apparatus 200 may determine the order of operations in response to the plurality of control commands, and may perform the operations responsive to the plurality of control commands in the determined order.

In addition, the controller 240 may perform the voice recognition on the voice data and may generate a response voice in response to the user voice utterance recognized by the voice recognition. Also, the sound outputter 250 may output the response voice generated by the controller 240. In other words, the sound apparatus 200 may talk with the user.

As described above, the sound output system 1 may receive from the user U the user voice utterance including the plurality of control commands. The sound output system 1 may recognize the plurality of control commands by performing the voice recognition on the user voice utterance using the sound apparatus 200. In addition, the sound apparatus 200 may execute the plurality of operations corresponding to the plurality of control commands by executing a plurality of different application programs related to the plurality of control commands.

As described above, the sound output system 1 may increase the recognition rate of the voice recognition by receiving the user voice utterance using the portable voice receiving apparatus 100, and may simultaneously process the plurality of control commands through the voice.

In the above description, the receiving apparatus 100 may receive the user voice utterance and the sound apparatus 200 may perform the voice recognition on the user voice utterance. However, the present disclosure is not limited thereto. For example, the receiving apparatus 100 may receive the user voice utterance and then perform the voice recognition on the user voice utterance, and the sound apparatus 200 may operate based on the recognized user voice utterance.

Figure 9:
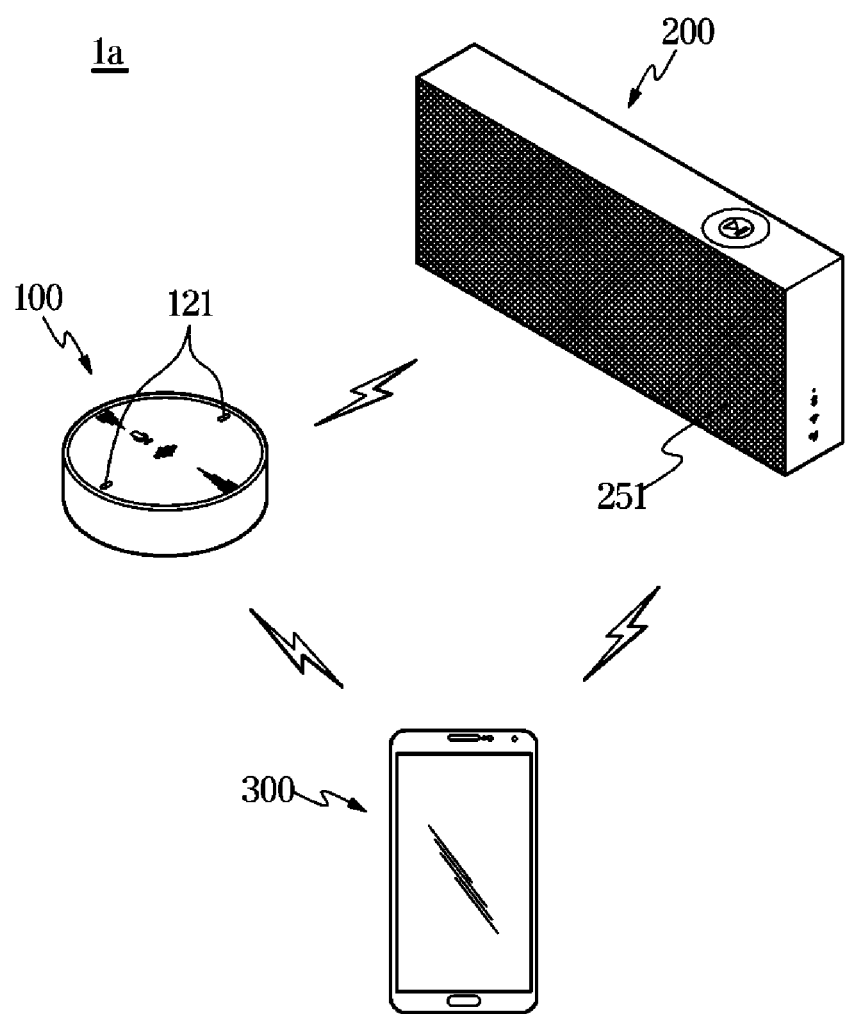
FIG. 9 is a diagram illustrating another example of the sound output system according to an embodiment.

FIG. 9 is a diagram illustrating another example of the sound output system according to an embodiment.

Referring to FIG. 9, a sound output system 1a may include the receiving apparatus 100 for receiving the user voice utterance, the sound apparatus 200 for outputting sound, and a user apparatus 300 for recognizing the user voice utterance.

The receiving apparatus 100 may receive the user voice utterance.

The receiving apparatus 100 may communicate wired or wireless with the sound apparatus 200 and/or the user apparatus 300 and may transmit the voice data corresponding to the user voice utterance to the sound apparatus 200 and/or the user apparatus 300.

The sound apparatus 200 may output sound.

The sound apparatus 200 may communicate by wire or wirelessly with the receiving apparatus 100 and may receive the voice data corresponding to the user voice utterance from the receiving apparatus 100 by wire or wirelessly. The sound apparatus 200 may communicate wired or wireless with the user apparatus 300 and may transmit the voice data received from the receiving apparatus 100 to the user apparatus 300. In addition, the sound apparatus 200 may perform various operations based on the user input.

The user apparatus 300 may communicate by wire or wirelessly with the receiving apparatus 100 and/or the sound apparatus 200 and may receive the voice data from the receiving apparatus 100.

The user apparatus 300 may include voice recognition applications that can process the voice data to recognize the contents of the user voice utterance. For example, the voice recognition applications may determine the meaning of the user voice utterance by extracting the voice feature from the voice data and comparing the voice feature with the previously stored voice model. The voice recognition applications may, for example, also recognize user voice utterances using machine learning or deep learning.

The user apparatus 300 may perform various operations based on the recognized user voice utterance. For example, the user apparatus 300 may perform a voice call requested by the user voice utterance or may provide the user with the information requested by the user voice utterance.

The user apparatus 300 may transmit the contents of the recognized user voice utterance to the receiving apparatus 100 and/or the sound apparatus 200. For example, the user apparatus 300 may transmit the control command(s) recognized from the user voice utterance to the receiving apparatus 100 and/or the sound apparatus 200. The sound apparatus 200 may operate in accordance with the control command(s) received from the user apparatus 300.

For example, the user apparatus 300 may recognize the plurality of different control command(s) included in a single utterance voice of the user and perform the plurality of different operations in response to the plurality of different control command(s). For example, when the user utters the voice "call sister and raise the volume to 10," the user apparatus 300 may execute a call application to talk with another person, request the "sister" to talk, and transmit a volume control command to the sound apparatus 200 directly or through the receiving apparatus 100.

The user apparatus 300 may generate voice data of the response voice in response to the recognized user voice utterance and may transmit the voice data of the response voice to the sound apparatus 200 directly or through the receiving apparatus 100. The sound apparatus 200 may output sound according to the voice data received from the user apparatus 300.

The user apparatus 300 may be a general purpose computing device having a communication function. For example, and without limitation, the user apparatus 300 may be a handheld personal computer, a tablet computer, a mobile phone, a cellular phone, a laptop computer, a desktop computer, a workstation, and the like.

Figure 10:
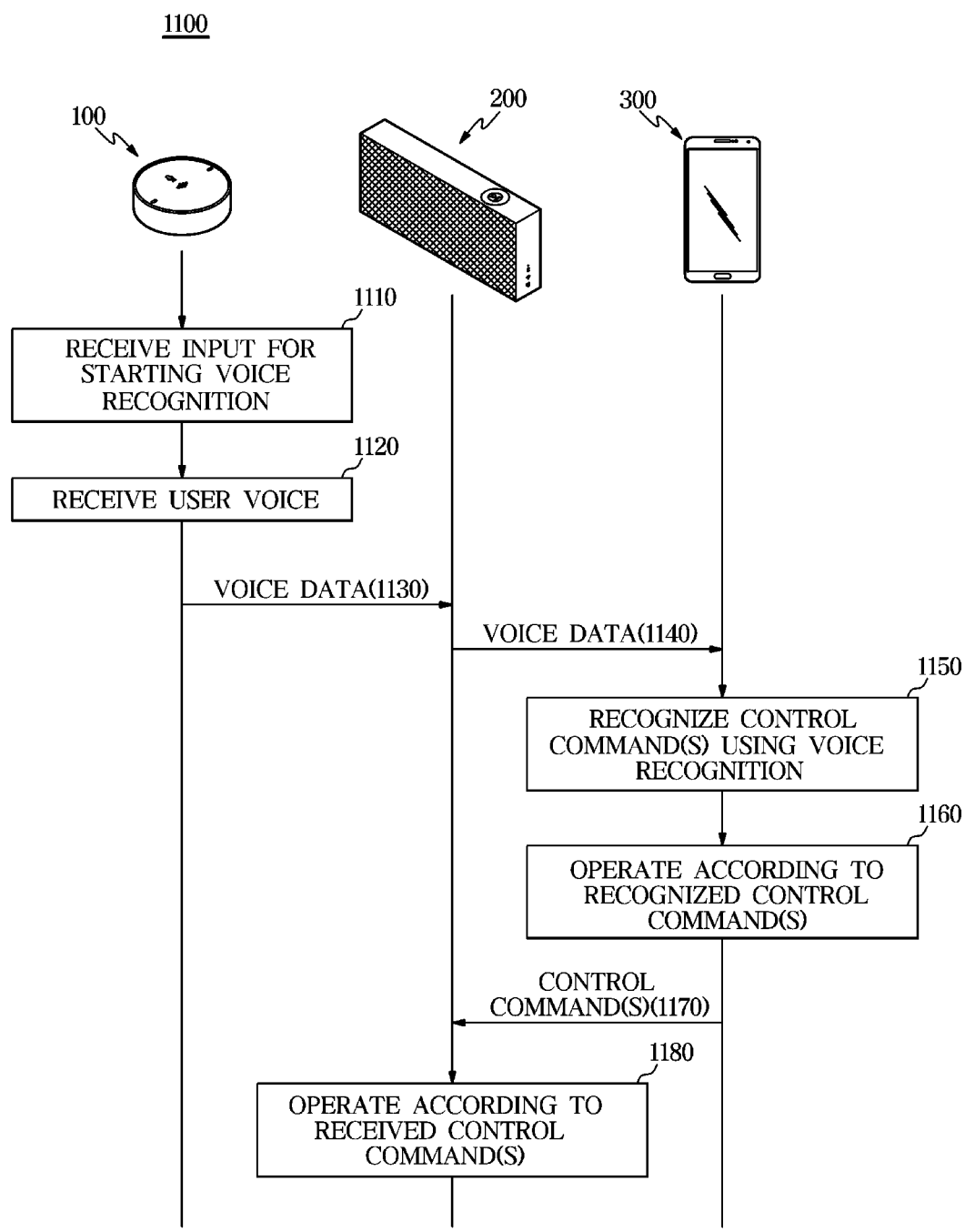
FIG. 10 is a sequence diagram illustrating an example voice recognition operation of the sound output system illustrated in FIG. 9.
Figure 11:
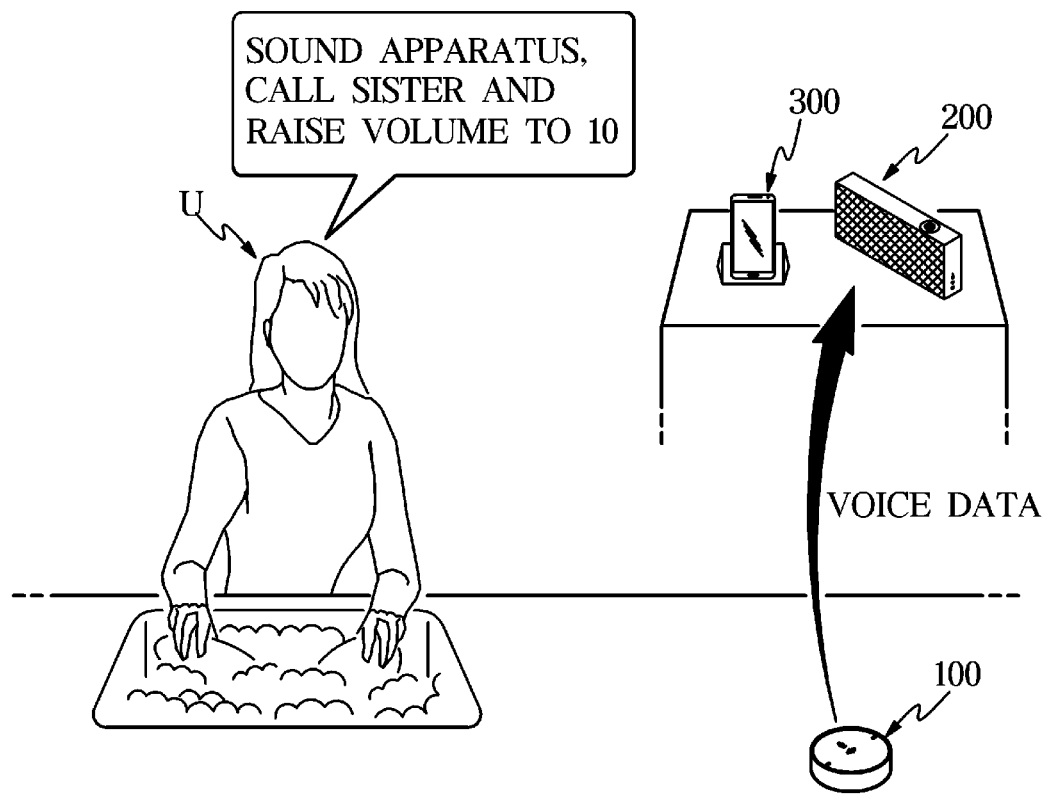
FIG. 11 is a diagram illustrating an example in which the sound output system illustrated in FIG. 9 processes control command(s)

FIG. 10 is a sequence diagram illustrating the voice recognition operation of the sound output system illustrated in FIG. 9 and FIG. 11 is a diagram illustrating an example in which the sound output system illustrated in FIG. 9 processes control command(s).

With reference to FIGS. 10 and 11, the voice recognition operation (1100) of the sound output system 1a is described.

The receiving apparatus 100 may receive an input for starting the voice recognition from the user (1110).

The operation 1110 may be the same as or similar to the operation 1010 of FIG. 8. For example, as illustrated in FIG. 11, the user U may utter "sound apparatus" so that the receiving apparatus 100 receives the user voice utterance and the sound apparatus 200 activates the voice recognition. In response to the "sound apparatus," which is the voice recognition initiation language of the user, the receiving apparatus 100 may start reception of the user voice utterance.

The receiving apparatus 100 may receive the user voice utterance from the user (1120).

The operation 1120 may be the same as or similar to the operation 1020 of FIG. 8. For example, as illustrated in FIG. 11, after uttering "sound apparatus," which is the voice recognition initiation language, the user U may utter "call sister and raise the volume to 10." The receiving apparatus 100 may receive the user voice utterance "call sister and raise the volume to 10," and convert the user voice utterance into voice data.

The receiving apparatus 100 may transmit the voice data to the sound apparatus 200, and the sound apparatus 200 may receive the voice data from the receiving apparatus 100 (1130).

The operation 1130 may be the same as or similar to the operation 1030, the operation 1040, and the operation 1050 of FIG. 8.

The sound apparatus 200 may transmit the voice data received from the receiving apparatus 100 to the user apparatus 300 and the user apparatus 300 may receive the voice data from the sound apparatus 200 (1140).

The sound apparatus 200 receiving the voice data from the receiving apparatus 100 may transmit the voice data to the user apparatus 300 for the voice recognition.

For more accurate voice recognition, the sound apparatus 200 may transmit the voice data to the user apparatus 300.

The user apparatus 300 may recognize the control command(s) based on the user voice utterance from the voice data using the voice recognition (1150).

The user apparatus 300 may include a high-performance processor as compared to the sound apparatus 200, and a voice recognition algorithm for processing various natural languages may be installed.

The user apparatus 300 may extract the voice feature from the voice data and compare the voice feature with the previously stored voice model. The user apparatus 300 may determine the meaning of the user voice utterance by comparing the voice feature of the voice data with the voice model.

For example, as illustrated in FIG. 11, the user apparatus 300 may perform the voice recognition on the voice data indicating "call sister and raise the volume to 10." By voice recognition, the user apparatus 300 may determine the control command to make a call and the control command to increase the sound output volume.

The user apparatus 300 may operate according to the control command(s) recognized by the voice recognition (1160).

The user apparatus 300 may determine the control command(s) that can be performed by the user apparatus 300 among the control command(s) recognized by the voice recognition and may operate according to the control command(s).

For example, as illustrated in FIG. 11, the user apparatus 300 may recognize the call command and the volume up command. The user apparatus 300 may determine that the call command can be performed by the user apparatus 300. Also, the user apparatus 300 may execute the call application for performing the call with another person, and may search for the "sister" in the contact and attempt to communicate with the "sister."

Also, the user apparatus 300 may perform the voice recognition on the voice data and generate the response voice in response to the user voice utterance recognized by the voice recognition.

The user apparatus 300 may transmit the control command(s) recognized by the voice recognition to the sound apparatus 200 and the sound apparatus 200 may receive the control command(s) from the user apparatus 300 (1170).

The user apparatus 300 may determine the control command(s) that can be performed by the sound apparatus 200 among the control command(s) recognized by the voice recognition and transmit the control command(s) that can be performed by the sound apparatus 200 to the sound apparatus 200.

For example, as illustrated in FIG. 11, the user apparatus 300 may recognize the call command and the volume up command. The user apparatus 300 may determine that the volume up command can be performed by the sound apparatus 200. The user apparatus 300 may transmit the volume up command to the sound apparatus 200.

In addition, the user apparatus 300 may generate a response voice in response to the user voice utterance recognized by the voice recognition, and may transmit the voice data of the response voice to the sound apparatus 200.

The sound apparatus 200 may operate according to (based on) the control command(s) received from the user apparatus 300 (1180).

The sound apparatus 200 may operate according to the control command(s) recognized by the voice recognition of the user apparatus 300.

For example, as illustrated in FIG. 11, the sound apparatus 200 may receive the volume up command from the user apparatus 300, and may increase the output volume of the sound outputter 250 through the operating system.

Also, the sound apparatus 200 may receive the voice data from the user apparatus 300, and may output the voice corresponding to the voice data through the sound outputter 250.

Figure 12:
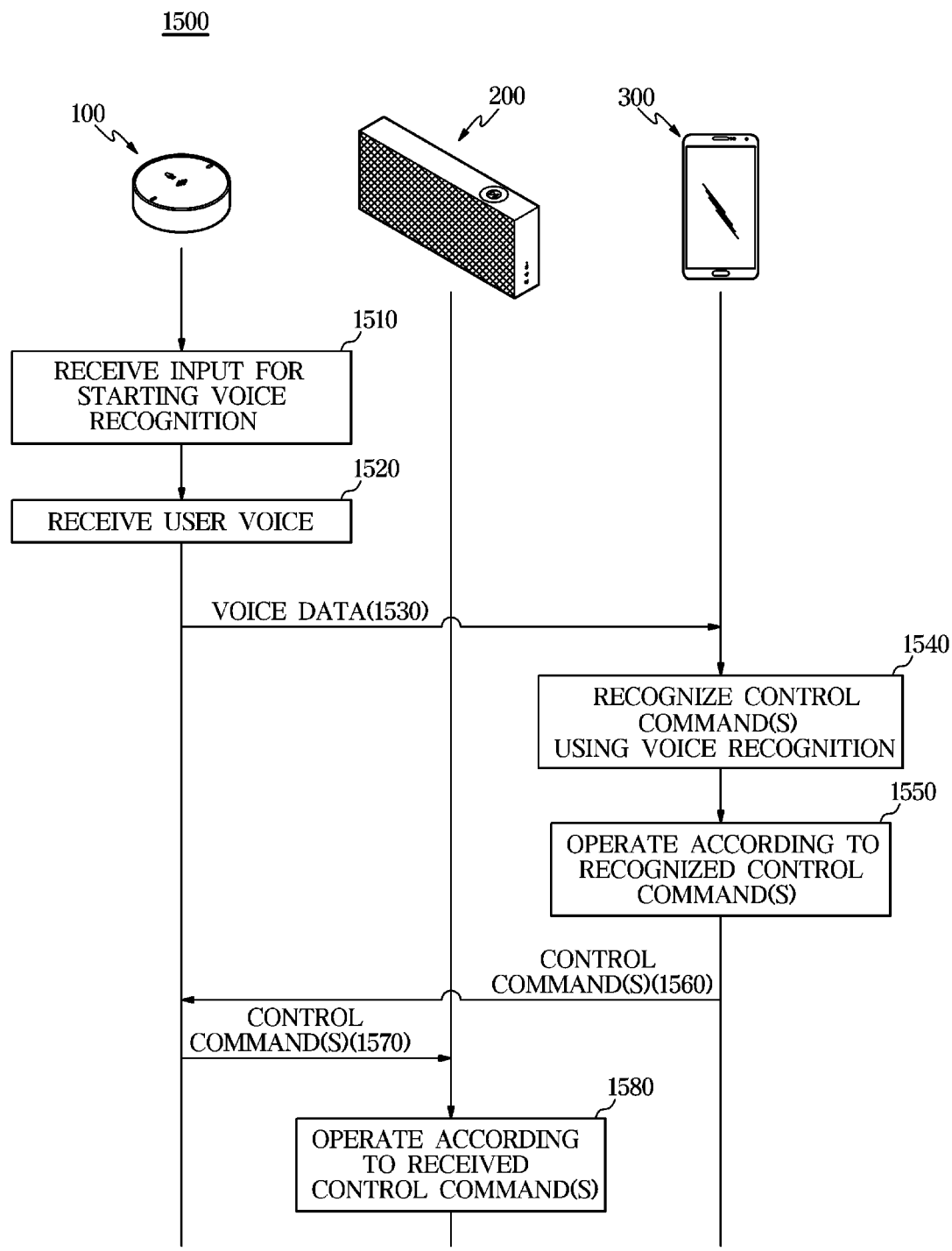
FIG. 12 is a sequence diagram illustrating another example of the voice recognition operation of the sound output system illustrated in FIG. 9.

FIG. 12 is a sequence diagram illustrating another example of the voice recognition operation of the sound output system illustrated in FIG. 9.

With reference to FIG. 12, the voice recognition operation (1500) of the sound output system 1a is described.

The receiving apparatus 100 may receive an input for starting the voice recognition from the user (1510). The operation 1510 may be the same as or similar to the operation 1110 of FIG. 10.

The receiving apparatus 100 may receive the user voice utterance from the user (1520). The operation 1520 may be the same as or similar to the operation 1120 of FIG. 10.

The receiving apparatus 100 may directly transmit voice data to the user apparatus 300 and the user apparatus 300 may receive the voice data from the receiving apparatus 100 (1530).

The receiving apparatus 100 may transmit the voice data directly to the user apparatus 300 and the user apparatus 300 may receive the voice data from the receiving apparatus 100. For example, the receiving apparatus 100 may transmit the voice data indicating "call sister and raise the volume to 10," which is the user voice utterance, to the user apparatus 300. The user apparatus 300 may receive the voice data indicating "call sister and raise the volume to 10," which is the user voice utterance.

The user apparatus 300 may recognize the control command(s) based on the user voice utterance from the voice data using the voice recognition (1540). The operation 1540 may be the same as or similar to the operation 1150 of FIG. 10.

The user apparatus 300 may operate in accordance with the control command(s) recognized by the voice recognition (1550). The operation 1550 may be the same as or similar to the operation 1160 of FIG. 10.

The user apparatus 300 may transmit the control command(s) recognized by the voice recognition to the receiving apparatus 100 and the receiving apparatus 100 may receive the control command(s) (1560).

The user apparatus 300 may determine the control command(s) that can be performed by the sound apparatus 200 among the control command(s) recognized by the voice recognition and may transmit the control command(s) to the receiving apparatus 100.

The receiving apparatus 100 may transmit the control command(s) received from the user apparatus 300 to the sound apparatus 200 and the sound apparatus 200 may receive the control command(s) from the receiving apparatus 100 (1570).

The sound apparatus 200 may operate in accordance with the control command(s) received from the receiving apparatus 100 (1580). The operation 1580 may be the same as the operation 1180 of FIG. 10.

As described above, the sound output system 1a may receive the user voice utterance included the plurality of control command(s) from the user U. The sound output system 1a may recognize the plurality of control commands by performing the voice recognition on the user voice utterance using the user apparatus 300 separately provided from the sound apparatus 200.

The user apparatus 300 may operate according to the control command(s) associated with the user apparatus 300 and may transmit control command(s) associated with the sound apparatus 200 to the sound apparatus 200. The sound apparatus 200 may operate according to the control command(s) received from the user apparatus 300.

As described above, the sound output system 1a may increase the recognition rate of the voice recognition by performing the voice recognition using the user apparatus 300, and may allow the user apparatus 300 and the sound apparatus 200 to process the control command(s) through the voice, respectively.

Figure 13:
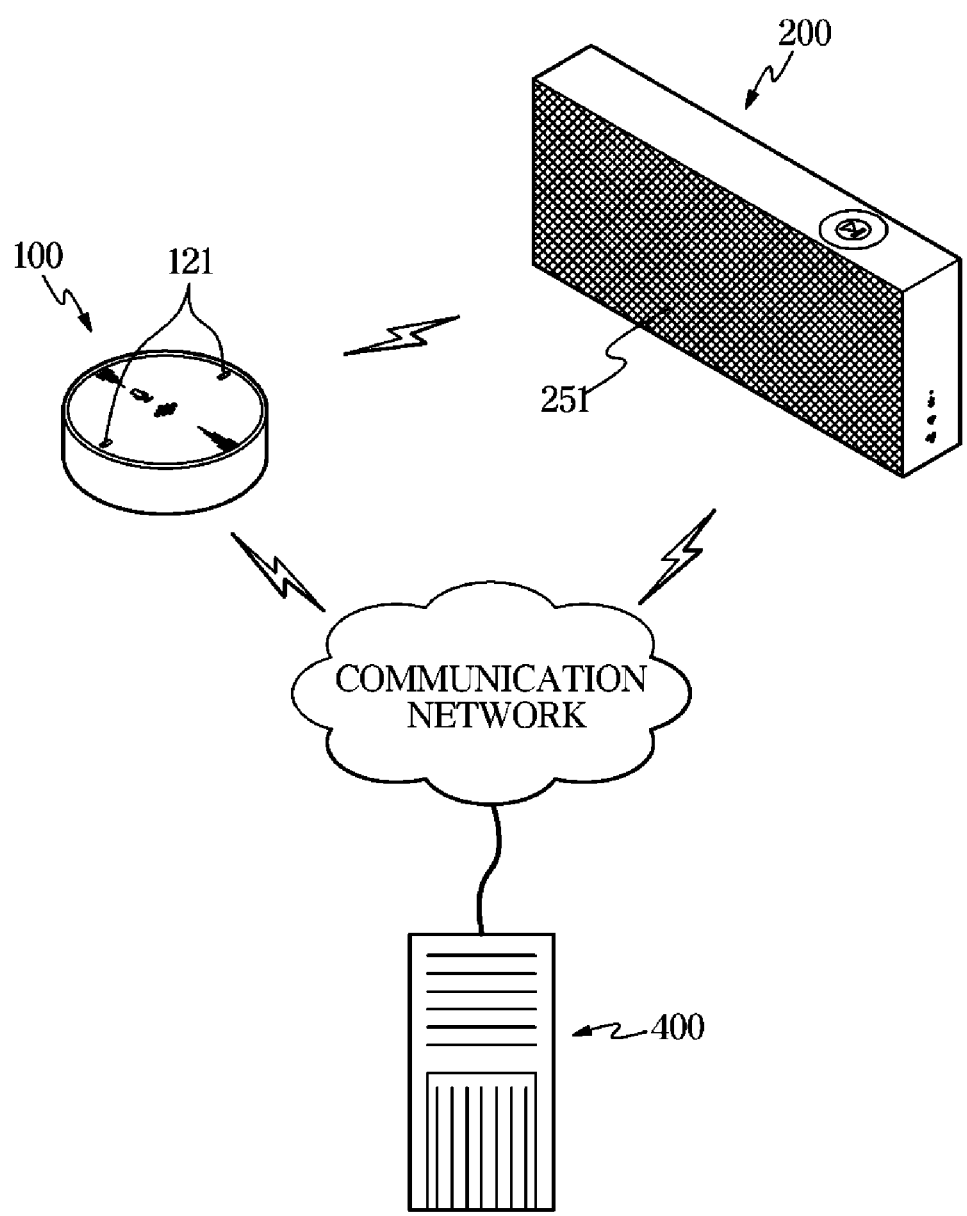
FIG. 13 is a diagram illustrating another example of the sound output system according to an embodiment.

FIG. 13 is a diagram illustrating another example of the sound output system according to an embodiment.

Referring to FIG. 13, a sound output system 1d may include the receiving apparatus 100 for receiving the user voice utterance, the sound apparatus 200 for outputting sound, and an AI (Artificial Intelligence) server apparatus 400 for recognizing the user voice utterance using machine learning or deep learning.

The receiving apparatus 100 may receive the user voice utterance.

The receiving apparatus 100 may communicate with the sound apparatus 200 by wire or wirelessly and may communicate with the AI server apparatus 400 through a communication network and transmit the voice data corresponding to the user voice utterance to the sound apparatus 200 and/or the AI server apparatus 400. The communication network may include both wired and wireless communication networks. The wired communication network may include a communication network such as, for example, and without limitation, a cable network, a telephone network, or the like, and the wireless communication network may include a communication network for transmitting and receiving signals through radio waves. The wireless communication network may include, for example, an access point AP relaying the wired communication network and the wireless communication network.

The sound apparatus 200 may output sound.

The sound apparatus 200 may communicate with the receiving apparatus 100 by wire or wirelessly and may receive the voice data corresponding to the user voice utterance from the receiving apparatus 100 by wire or wirelessly. The sound apparatus 200 may communicate with the AI server apparatus 400 through the communication network and may transmit the voice data received from the receiving apparatus 100 to the AI server apparatus 400. In addition, the sound apparatus 200 may perform various operations according to the user input.

The AI server apparatus 400 may communicate with the receiving apparatus 100 and/or the sound apparatus 200 and may receive the voice data from the receiving apparatus 100 and/or the sound apparatus 200. In addition, the AI server apparatus 400 may perform machine learning and/or deep learning on the voice recognition based on the voice data received from the receiving apparatus 100 and/or the sound apparatus 200.

For example, the AI server apparatus 400 may perform, for example, and without limitation, verbal understanding, prediction of reasoning, knowledge representation, or the like, using machine learning. The verbal understanding may, for example, refer to a technology for recognizing, applying, and processing human language/characters, and may include, for example, and without limitation, natural language processing, machine translation, dialogue system, query response, voice recognition/synthesis, and the like. The prediction of reasoning may refer, for example, to a technology for determining and logically inferring and predicting information, and may include, for example, and without limitation, knowledge/probability based reasoning, optimization prediction, preference base planning, recommendation, and the like. The knowledge representation may refer, for example, to a technology for automating human experience information into knowledge data, and may include, for example, and without limitation, knowledge building (data generation/classification), knowledge management (data utilization), and the like.

The AI server apparatus 400 may recognize the control command of the user by performing the voice recognition based on machine learning on the voice data. For example, the AI server apparatus 400 may recognize the plurality of control commands of the user from the voice data using the voice recognition, and may determine a target of the plurality of control commands and the order of the plurality of control commands. In addition, the AI server apparatus 400 may generate a sequence of the control commands based on the target of the plurality of control commands and the order of the plurality of control commands.

The AI server apparatus 400 may process the voice data to recognize the contents of the user voice utterance. For example, the AI server apparatus 400 may extract an interval for the voice recognition from the voice data received from the receiving apparatus 100 and/or the sound apparatus 200, and remove noise included in the voice data. In addition, the AI server apparatus 400 may extract the voice feature from the voice data and compare the voice feature to the previously stored voice model. The AI server apparatus 400 may determine the meaning of the user voice utterance by comparing the voice feature of the voice data with the voice model.

The AI server apparatus 400 may transmit the control command(s) recognized from the user voice utterance to the receiving apparatus 100 and/or the sound apparatus 200. The sound apparatus 200 may perform various operations according to the control command(s) received from the AI server apparatus 400.

For example, the AI server apparatus 400 may recognize the plurality of different control command(s) included in the single utterance voice of the user, and sequentially transmit the different control command(s) to the sound apparatus 200. For example, when the user utters the voice "play the music and raise the volume to 10," the AI server apparatus 400 may transmit the music playback command and the volume control command to the sound apparatus 200.

In addition, the AI server apparatus 400 may generate voice data of the response voice in response to the recognized user voice utterance and may transmit the voice data of the response voice to the sound apparatus 200. The sound apparatus 200 may output sound according to the voice data received from the AI server apparatus 400.

The AI server apparatus 400 may include, for example, a computing device having the communication function. For example, the AI server apparatus 400 may be a computing system called various names, such as the desktop computer, the workstation, and the like.

Figure 14:
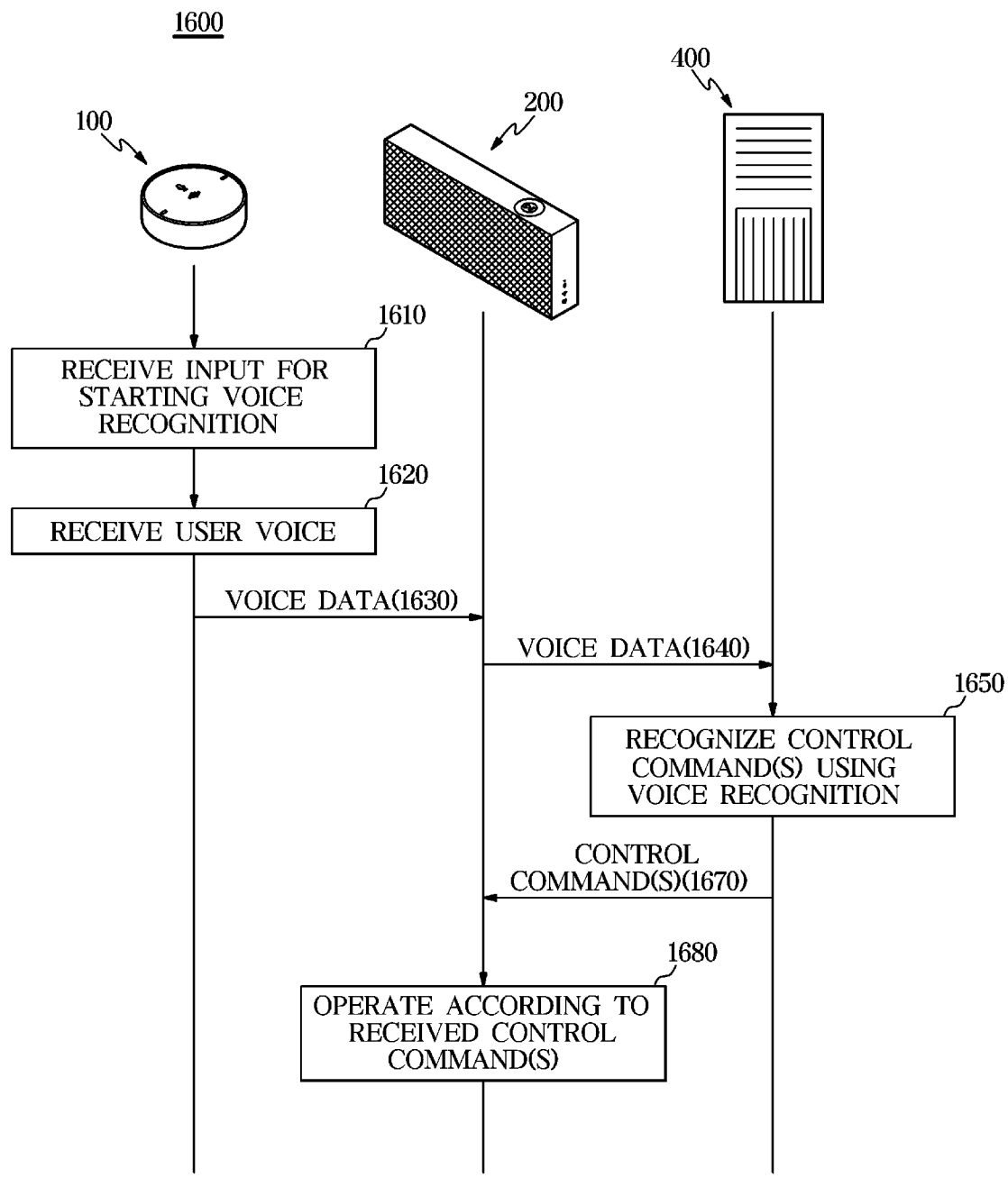
FIG. 14 is a sequence diagram illustrating an example voice recognition operation of the sound output system illustrated in FIG. 13.

FIG. 14 is a sequence diagram illustrating the voice recognition operation of the sound output system illustrated in FIG. 13.

With reference to FIG. 14, the voice recognition operation (1600) of the sound output system 1d is described.

The receiving apparatus 100 may receive an input for starting the voice recognition from the user (1610). The operation 1610 may be the same as or similar to the operation 1010 of FIG. 8.

The receiving apparatus 100 may receive the user voice utterance from the user (1620).

The operation 1620 may be the same as or similar to the operation 1020 of FIG. 8. For example, the user U may utter "play the music and raise the volume to 10." The receiving apparatus 100 may receive the user voice utterance "play the music and raise the volume to 10," and convert the user voice utterance into voice data.

The receiving apparatus 100 may transmit the voice data to the sound apparatus 200, and the sound apparatus 200 may receive the voice data from the receiving apparatus 100 (1630).

The operation 1630 may be the same as or similar to the operation 1030, the operation 1040, and the operation 1050 of FIG. 8.

The sound apparatus 200 may transmit the voice data received from the receiving apparatus 100 to the AI server apparatus 400 and the AI server apparatus 400 may receive the voice data from the sound apparatus 200 (1640).

The sound apparatus 200 receiving the voice data from the receiving apparatus 100 may transmit the voice data to the AI server apparatus 400 for the voice recognition. For example, the sound apparatus 200 may transmit the voice data to the AI server apparatus 400 through the wired communication network and/or the wireless communication network. For example, the sound apparatus 200 may transmit the voice data to the AI server apparatus 400 through a cable connected to the communication network. The sound apparatus 200 may transmit the voice data to the AI server apparatus 400 through an AP apparatus connected to the communication network.

For more accurate voice recognition, the sound apparatus 200 may transmit the voice data to the AI server apparatus 400.

The AI server apparatus 400 may recognize the control command(s) based on the user voice utterance from the voice data using the voice recognition (1650).

The AI server apparatus 400 may include the high-performance processor as compared to the sound apparatus 200, and may include the voice recognition algorithm for processing various natural languages and a learning algorithm for the voice recognition. For example, the AI server apparatus 400 may perform the voice recognition using deep learning using, for example, a neural network circuit or the like.

The AI server apparatus 400 may extract the voice feature from the voice data and compare the voice feature with the previously stored voice model. The AI server apparatus 400 may determine the meaning of the user voice utterance by comparing the voice feature of the voice data with the voice model.

For example, the AI server apparatus 400 may perform the voice recognition on the voice data indicating "play the music and raise the volume to 10." By the voice recognition, the AI server apparatus 400 may determine the control command for playing music and the control command for increasing the sound output volume.

The AI server apparatus 400 may transmit the control command(s) recognized by the voice recognition to the sound apparatus 200 and the sound apparatus 200 may receive the control command(s) from the AI server apparatus 400 (1670).

The AI server apparatus 400 may determine the control command(s) that can be performed by the sound apparatus 200 among the control command(s) recognized by the voice recognition and transmit the control command(s) that can be performed by the sound apparatus 200 to the sound apparatus 200.

For example, the user apparatus 300 may recognize the call command and the volume up command. The user apparatus 300 may determine that the volume up command can be performed by the sound apparatus 200. The user apparatus 300 may transmit the volume up command to the sound apparatus 200.

For example, the AI server apparatus 400 may recognize the music playback command and the volume up command. The AI server apparatus 400 may transmit the music playback command and the volume up command to the sound apparatus 200.

The sound apparatus 200 may operate according to the control command(s) received from the AI server apparatus 400 (1680).

The sound apparatus 200 may operate based on the control command(s) recognized by the voice recognition of the AI server apparatus 400.

For example, the sound apparatus 200 may receive the music playback command and the volume up command. The sound apparatus 200 may execute the music playback application and play the music. Also, the sound apparatus 200 may increase the output volume through the operating system.

Figure 15:
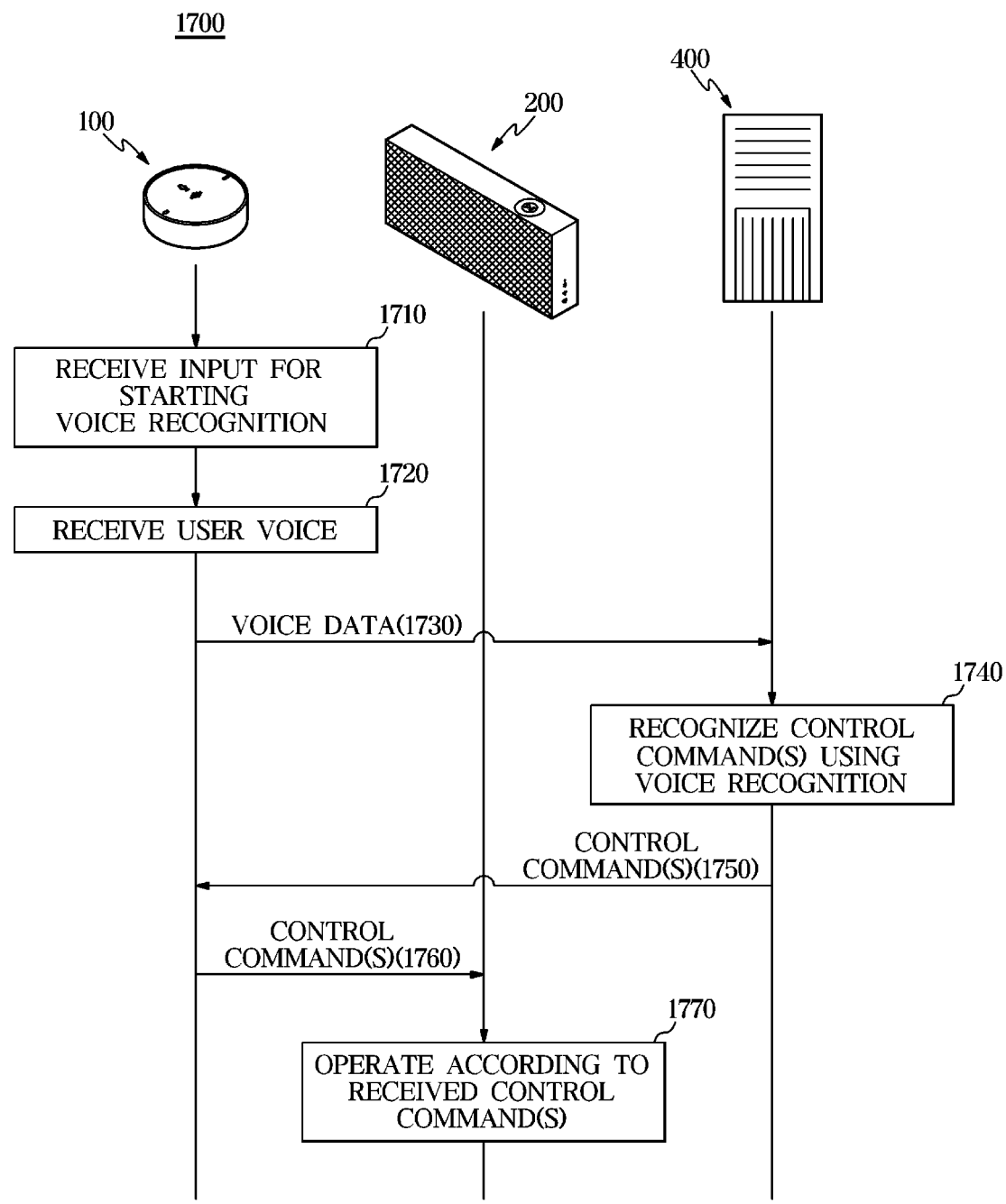
FIG. 15 is a sequence diagram illustrating another example of the voice recognition operation of the sound output system illustrated in FIG. 13.

FIG. 15 is a sequence diagram illustrating another example of the voice recognition operation of the sound output system illustrated in FIG. 13.

With reference to FIG. 15, the voice recognition operation (1700) of the sound output system 1d is described.

The receiving apparatus 100 may receive an input for starting the voice recognition from the user (1710). The operation 1710 may be the same as or similar to the operation 1610 of FIG. 14.

The receiving apparatus 100 may receive the user voice utterance from the user (1720). The operation 1720 may be the same as or similar to the operation 1620 of FIG. 14.

The receiving apparatus 100 may directly transmit the voice data to the AI server apparatus 400 and the AI server apparatus 400 may receive the voice data from the receiving apparatus 100 (1730).

The receiving apparatus 100 may transmit the voice data to the AI server apparatus 400 through the communication network and the AI server apparatus 400 may receive the voice data from the receiving apparatus 100. For example, the receiving apparatus 100 may transmit the voice data indicating "play the music and raise the volume to 10," which is the user voice utterance, to the AI server apparatus 400, and the AI server apparatus 400 may transmit the voice data.

The AI server apparatus 400 may recognize the control command(s) based on the user voice utterance from the voice data using the voice recognition (1740). The operation 1740 may be the same as or similar to the operation 1650 of FIG. 14.

The AI server apparatus 400 may transmit the control command(s) recognized by the voice recognition to the receiving apparatus 100 and the receiving apparatus 100 may receive the control command(s) from the AI server apparatus 400 (1750).

The AI server apparatus 400 may determine the control command(s) that can be performed by the sound apparatus 200 among the control command(s) recognized by the voice recognition and transmit the control command(s) to the receiving apparatus 100 to transmit the control command(s) to the sound apparatus 200.

The receiving apparatus 100 may transmit the control command(s) received from the user apparatus 300 to the sound apparatus 200 and the sound apparatus 200 may receive the control command(s) from the receiving apparatus 100 (1760). The sound apparatus 200 may operate according to the control command(s) received from the receiving apparatus 100 (1770). The sound apparatus 200 may operate according to the control command(s) recognized by the voice recognition of the AI server apparatus 400.

As described above, the sound output system 1d may receive from the user U the user voice utterance including the plurality of control commands(s). The sound output system 1d may perform the voice recognition on the user voice utterance using the AI server apparatus 400 provided separately from the sound apparatus 200 to recognize the plurality of control command(s).

The AI server apparatus 400 may transmit the control command(s) to the sound apparatus 200. The sound apparatus 200 may operate based on the control command(s) received from the AI server apparatus 400.

As described above, the sound output system 1d may increase the recognition rate of the voice recognition by performing the voice recognition using the AI server apparatus 400 and allow the sound apparatus 200 to process the plurality of control commands through the voice.

Figure 16:
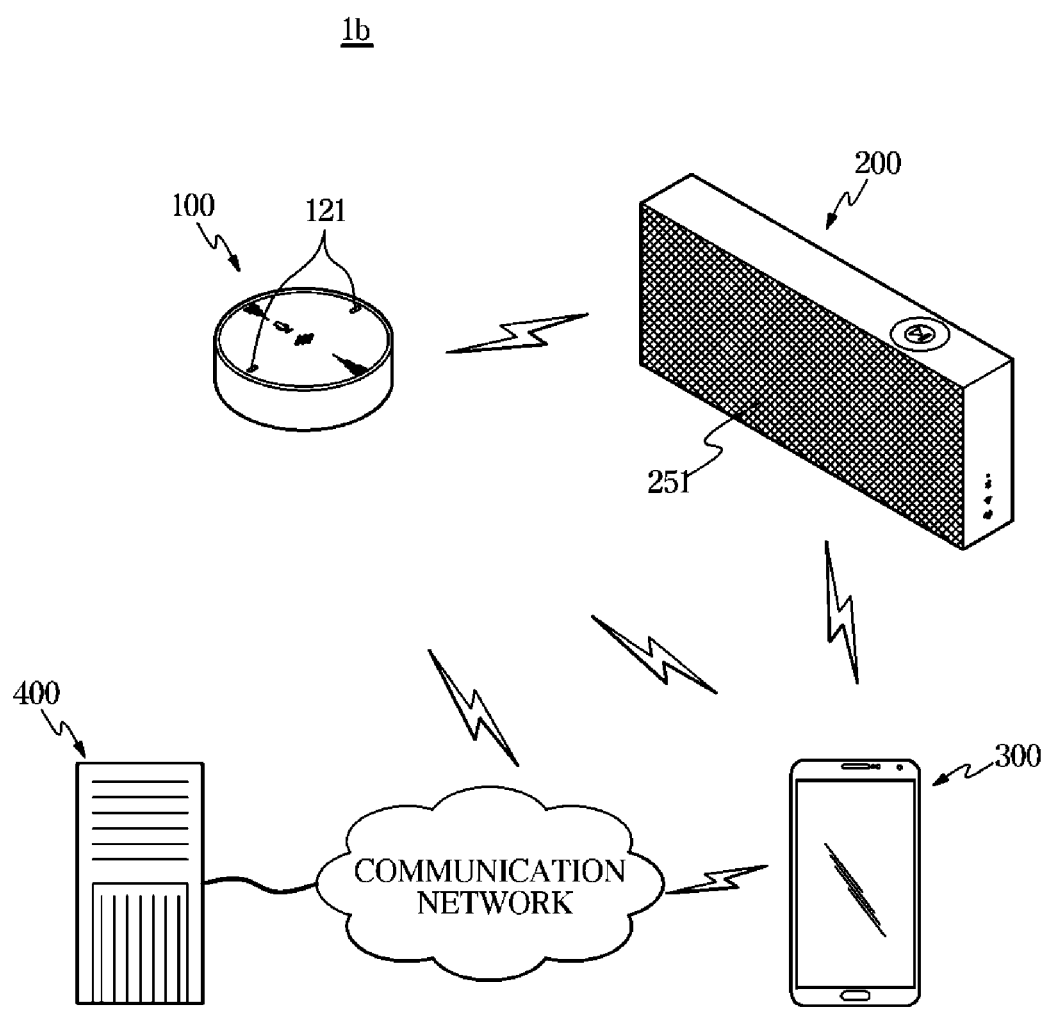
FIG. 16 is a diagram illustrating another example of the sound output system according to an embodiment.

FIG. 16 is a diagram illustrating another example of the sound output system according to an embodiment.

Referring to FIG. 16, a sound output system 1b may include the receiving apparatus 100 for receiving the user voice utterance, the sound apparatus 200 for outputting sound, the user apparatus 300 for communicating with the sound apparatus 200, and the AI server apparatus 400 for communicating with the user apparatus 300 and recognizing the user voice utterance.

The receiving apparatus 100 may receive the user voice utterance.

The receiving apparatus 100 may communicate with the sound apparatus 200 and/or the user apparatus 300 and/or the AI server apparatus 400 and may transmit the voice data corresponding to the user voice utterance to the sound apparatus 200 and/or to the user apparatus 300 and/or the AI server apparatus 400.

The sound apparatus 200 may output sound.

The sound apparatus 200 may communicate with the receiving apparatus 100 and/or the user apparatus 300 and/or the AI server apparatus 400. The sound apparatus 200 may receive the voice data corresponding to the user voice utterance from the receiving apparatus 100 and transmit the voice data received from the receiving apparatus 100 to the user apparatus 300 and/or the AI server apparatus 400.

The user apparatus 300 may, for example, be the general purpose computing device having the communication function.

The user apparatus 300 may communicate with the receiving apparatus 100 and/or the sound apparatus 200 and/or the AI server apparatus 400. The user apparatus 300 may receive the voice data corresponding to the user voice utterance from the receiving apparatus 100 and/or the sound apparatus 200 and transmit the voice data received from the receiving apparatus 100 and/or the sound apparatus 200 to the AI server apparatus 400.

The AI server apparatus 400 may communicate with a plurality of user apparatuses and may receive the voice data from the plurality of user apparatuses. In addition, the AI server apparatus 400 may, for example, perform machine learning on the voice recognition based on the voice data received from the plurality of user apparatuses.

The AI server apparatus 400 may communicate with the receiving apparatus 100 and/or the sound apparatus 200 and/or the user apparatus 300. The AI server apparatus 400 may receive the voice data corresponding to the user voice utterance from the receiving apparatus 100 and/or the sound apparatus 200 and/or the user apparatus 300.

The AI server apparatus 400 may process the voice data to recognize the contents of the user voice utterance. The AI server apparatus 400 may transmit the control command(s) recognized from the user voice utterance to the user apparatus 300 and/or the sound apparatus 200. For example, the AI server apparatus 400 may recognize the plurality of different control command(s) included in the single utterance voice of the user and may transmit different control command(s) to the user apparatus 300 and the sound apparatus 200, respectively. For example, when the user utters the voice "call sister and raise the volume to 10," the AI server apparatus 400 may transmit the call command to the user apparatus 300 and transmit the volume control command to the sound apparatus 200.

Figure 17:
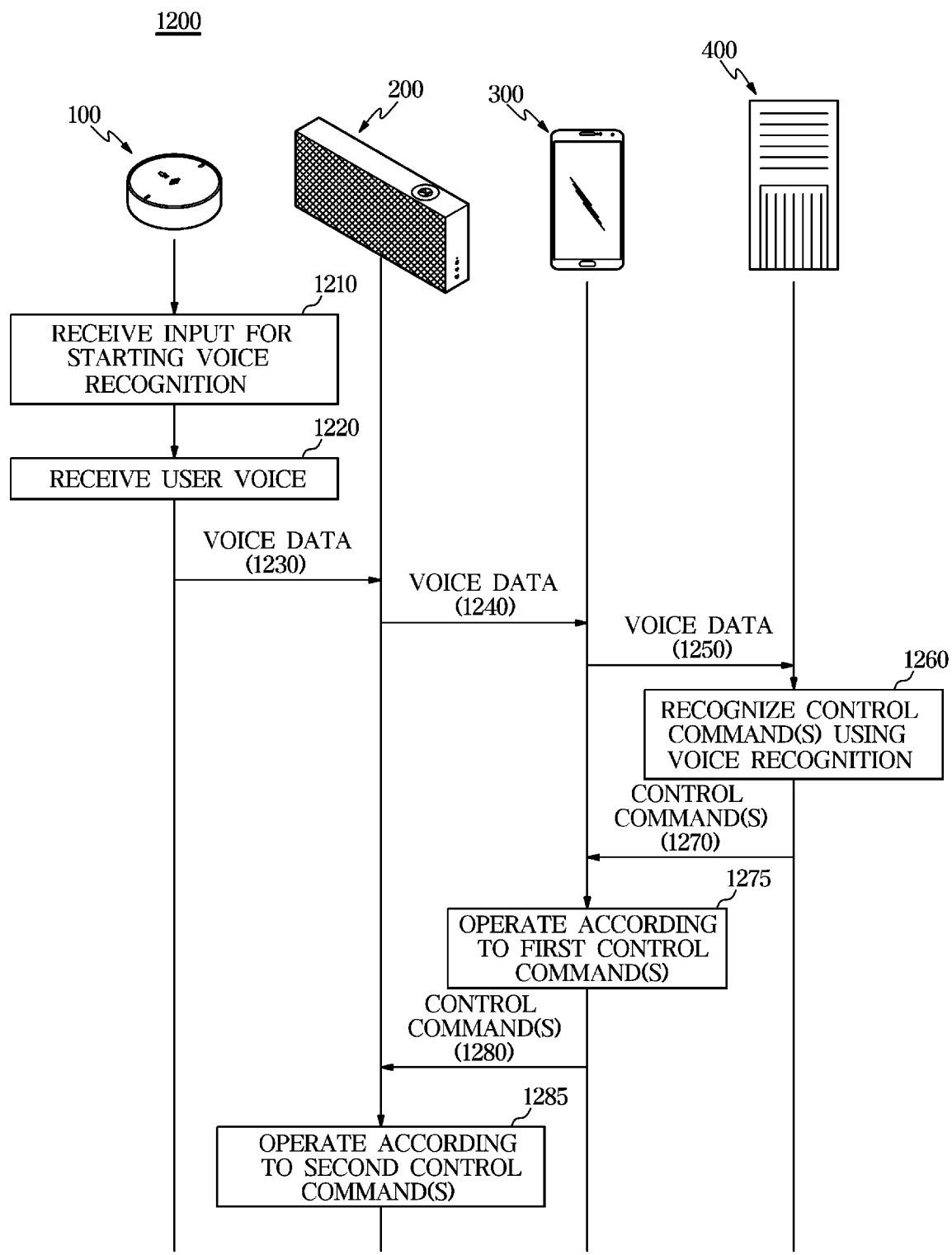
FIG. 17 is a sequence diagram illustrating an example voice recognition operation of the sound output system illustrated in FIG. 16.

FIG. 17 is a sequence diagram illustrating the voice recognition operation of the sound output system illustrated in FIG. 16.

With reference to FIG. 17, the voice recognition operation (1200) of the sound output system 1b is described.

The receiving apparatus 100 may receive an input for starting the voice recognition from the user (1210). The operation 1210 may be the same as or similar to the operation 1110 of FIG. 9.

The receiving apparatus 100 may receive the user voice utterance from the user (1220). The operation 1220 may be the same as or similar to the operation 1120 of FIG. 9.

The receiving apparatus 100 may transmit the voice data to the sound apparatus 200 and the sound apparatus 200 may receive the voice data from the receiving apparatus 100 (1230). The operation 1230 may be the same as or similar to the operation 1130 of FIG. 9.

The sound apparatus 200 may transmit the voice data received from the receiving apparatus 100 to the user apparatus 300 and the user apparatus 300 may receive the voice data from the sound apparatus 200 (1240). The operation 1240 may be the same as or similar to the operation 1140 of FIG. 9.

The user apparatus 300 may transmit the voice data received from the sound apparatus 200 to the AI server apparatus 400 and the AI server apparatus 400 may receive the voice data from the user apparatus 300 (1250).

The user apparatus 300 receiving the voice data from the sound apparatus 200 may transmit the voice data to the AI server apparatus 400 for the voice recognition.

The AI server apparatus 400 may recognize the control command(s) based on the user voice utterance from the voice data using the voice recognition (1260).

The AI server apparatus 400 may, for example, extract the voice feature from the voice data and compare the voice feature with the previously stored voice model. The AI server apparatus 400 may, for example, determine the meaning of the user voice utterance by comparing the voice feature of the voice data with the voice model.

For example, the AI server apparatus 400 may perform the voice recognition on the voice data indicating "call sister and raise the volume to 10." By the voice recognition, the AI server apparatus 400 may determine the control command to make a call and the control command to increase the sound output volume.

The AI server apparatus 400 may also distinguish between first control command(s) that can be performed by the user apparatus 300 and second control command(s) that can be performed by the sound apparatus 200 among the control command(s) recognized by the voice recognition.

For example, the AI server apparatus 400 may recognize the call command and the volume up command. The call command may be determined to be the first control command performed by the user apparatus 300 and the volume up command may be determined to be the second control command performed by the sound apparatus 200.

In addition, the AI server apparatus 400 may perform the voice recognition on the voice data and generate the response voice in response to the user voice utterance recognized by the voice recognition.

The AI server apparatus 400 may transmit the first and second control commands recognized by the voice recognition to the user apparatus 300 and the user apparatus 300 may receive the first and second control commands from the AI server apparatus 400 (1270).

The AI server apparatus 400 may transmit the call command and the volume up command to the user apparatus 300 in order to transmit the call command and the volume up command to the user apparatus 300 and the sound apparatus 200, respectively.

The user apparatus 300 may operate according to the first control command(s) received from the AI server apparatus 400 (1275).

The user apparatus 300 may operate according to the first control command(s) for the user apparatus 300 among the plurality of control command(s) received from the AI server apparatus 400. For example, in response to the call command received from the AI server apparatus 400, the user apparatus 300 may execute the call application for performing the call with another person, and may search for the "sister" in the contact and attempt to communicate with the "sister."

The user apparatus 300 may transmit the second control command(s) received from the AI server apparatus 400 to the sound apparatus 200 and the sound apparatus 200 may receive the second control command(s) from the user apparatus 300 (1280).

The user apparatus 300 may transmit the second control command(s) for the sound apparatus 200 among the plurality of control commands(s) received from the AI server apparatus 400 to the sound apparatus 200. For example, the user apparatus 300 may transmit the volume up command received from the AI server apparatus 400 to the sound apparatus 200.

The sound apparatus 200 may operate according to the second control command(s) received from the user apparatus 300 (1285).

The sound apparatus 200 may operate according to the second control command(s) received from the user apparatus 300. For example, the sound apparatus 200 may receive the volume up command from the user apparatus 300 and may increase the output volume of the sound outputter 250 through the operating system.

As described above, the sound output system 1b may receive from the user U the user voice utterance including the plurality of control commands(s). The sound output system 1b may perform the voice recognition on the user voice utterance using the AI server apparatus 400 provided separately from the sound apparatus 200 and the user apparatus 300 to recognize the plurality of control command(s). The AI server apparatus 400 may transmit the recognized control command(s) to the user apparatus 300 and the sound apparatus 200, respectively.

As described above, the sound output system 1b may increase the recognition rate of the voice recognition by performing the voice recognition using the AI server apparatus 400 and allow the user apparatus 300 and the sound apparatus 200 to process the plurality of controls command(s) through the voice, respectively.

In addition, the receiving apparatus 100 may communicate with the user apparatus 300, and the receiving apparatus 100 may transmit the voice data to the user apparatus 300. The user apparatus 300 may transmit the voice data to the AI server apparatus 400 and the AI server apparatus 400 may recognize the control command(s) from voice data using the voice recognition. The AI server apparatus 400 may transmit the control command(s) to the user apparatus 300 and the user apparatus 300 may transmit the control command(s) to the receiving apparatus 100. The receiving apparatus 100 may transmit the control command(s) to the sound apparatus 200 and the sound apparatus 200 may operate according to the control command(s) received from the receiving apparatus 100.

Figure 18:
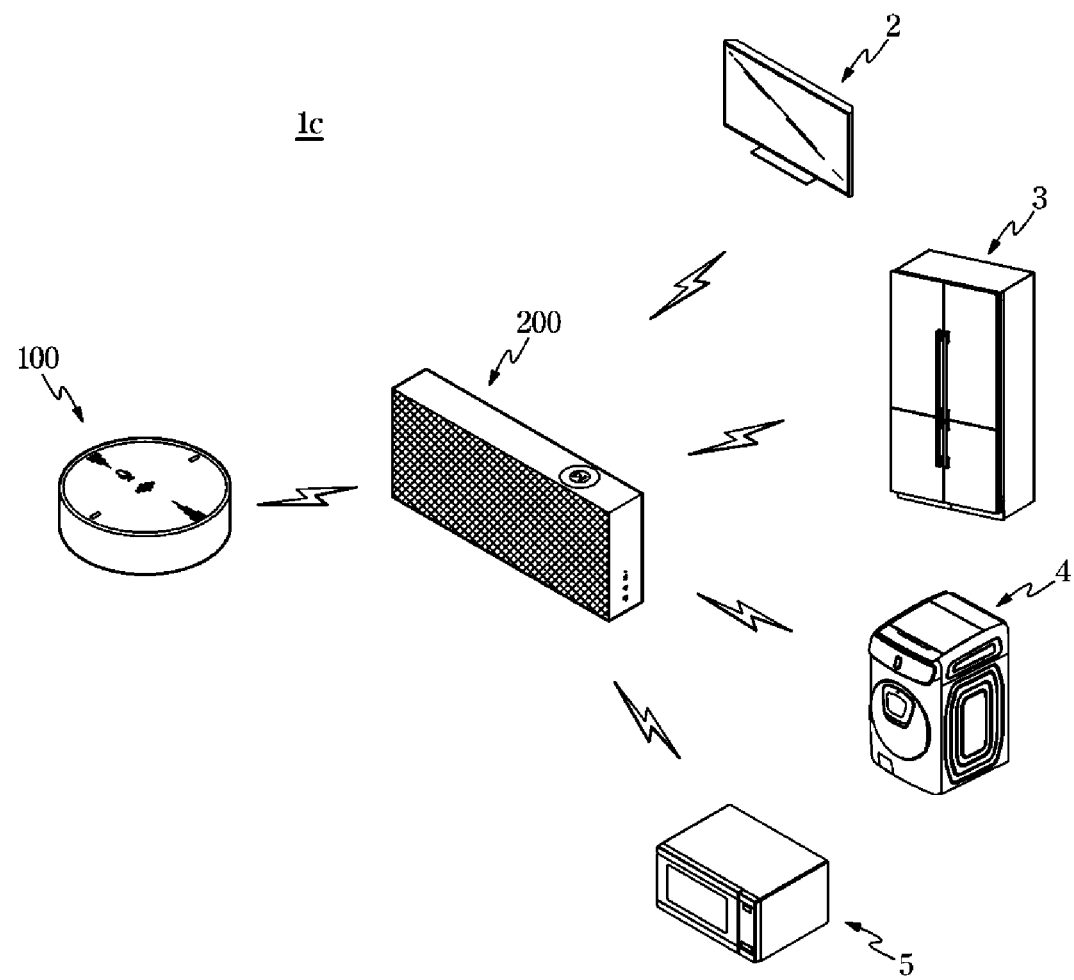
FIG. 18 is a diagram illustrating another example of the sound output system according to an embodiment.

FIG. 18 is a diagram illustrating another example of the sound output system according to an embodiment.

Referring to FIG. 18, a sound output system 1c may include the receiving apparatus 100 for receiving the user voice utterance and the sound apparatus 200 for recognizing the user voice utterance and outputting sound according to the control command(s).

The receiving apparatus 100 may be the same as or similar to that illustrated in FIG. 1.

The sound apparatus 200 may output sound.

The sound apparatus 200 may communicate with the receiving apparatus 100 by wire or wirelessly and may receive the voice data corresponding to the user voice utterance from the receiving apparatus 100 by wire or wirelessly.

The sound apparatus 200 may process the voice data to recognize the contents of the user voice utterance. For example, the sound apparatus 200 may perform various operations based on the contents of the recognized utterance voice, or may output the response voice in response to the user voice utterance.

The sound apparatus 200 may communicate by wire or wirelessly with electronic devices 2, 3, 4 and 5 and may transmit the control command(s) recognized from the user voice utterance to the electronic devices 2, 3, 4 and 5. For example, the sound apparatus 200 may communicate with, for example, and without limitation, the television 2, the refrigerator 3, the washing machine 4, the microwave oven 5, or the like by wire or wirelessly. The sound apparatus 200 may transmit the control command(s) recognized from the user voice utterance to the television 2, the refrigerator 3, the washing machine 4, the microwave oven 5, or the like.

For example, the sound apparatus 200 may determine a transfer target of the control command(s) from the contents of the user voice utterance recognized by the user voice utterance. For example, the sound apparatus 200 may extract the names of the electronic devices 2, 3, 4 and 5 from the user voice utterance, and may determine the transfer target of the control command(s) based on the names of the electronic devices 2, 3, 4 and 5.

For example, when the content of the user voice utterance recognized from the user voice utterance includes "television" or "TV," the sound apparatus 200 may determine the transfer target of the control command(s) recognized from the user voice utterance as the television 2. When the content of the user voice utterance includes "microwave oven," the sound apparatus 200 may determine the transfer target of the control command(s) as the microwave oven 5.

As described above, the sound apparatus 200 may recognize the contents of the user voice utterance by performing the voice recognition on the voice data received from the receiving apparatus 100 and may transmit the control command(s) recognized from the contents of the user voice utterance to the electronic devices 2, 3, 4 and 5 recognized from the contents of the user voice utterance.

In the above description, the sound apparatus 200 may perform the voice recognition on the voice data, but the present disclosure is not limited thereto. For example, the sound output system 1c may further include the user apparatus 300 and/or the AI server apparatus 400, as illustrated in FIGS. 9 and 16. Also, the user apparatus 300 and/or the AI server apparatus 400 may perform the voice recognition on the voice data and transmit the recognized control command(s) from the user voice utterance to the sound apparatus 200.

However, the present disclosure is not limited thereto, and the receiving apparatus 100 may process the voice data to recognize the contents of the user voice utterance and communicate with the electronic devices 2 to 5 by wire or wirelessly. The receiving apparatus 100 may also receive the user voice utterance and transmit the recognized control command(s) from the user voice utterance to the electronic devices 2, 3, 4 and 5.

Figure 19:
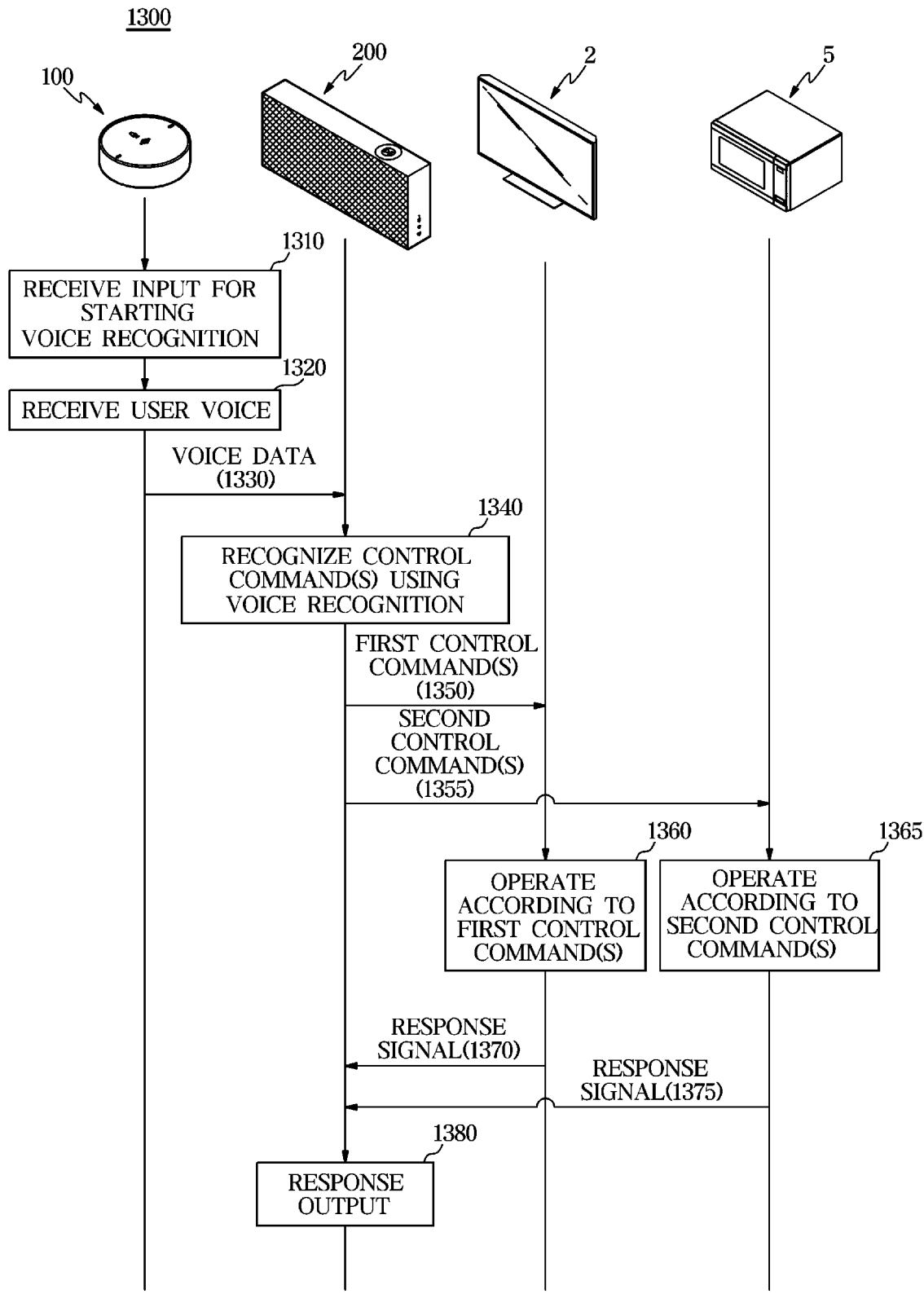
FIG. 19 is a sequence diagram illustrating an example of the voice recognition operation of the sound output system illustrated in FIG. 18.
Figure 20:
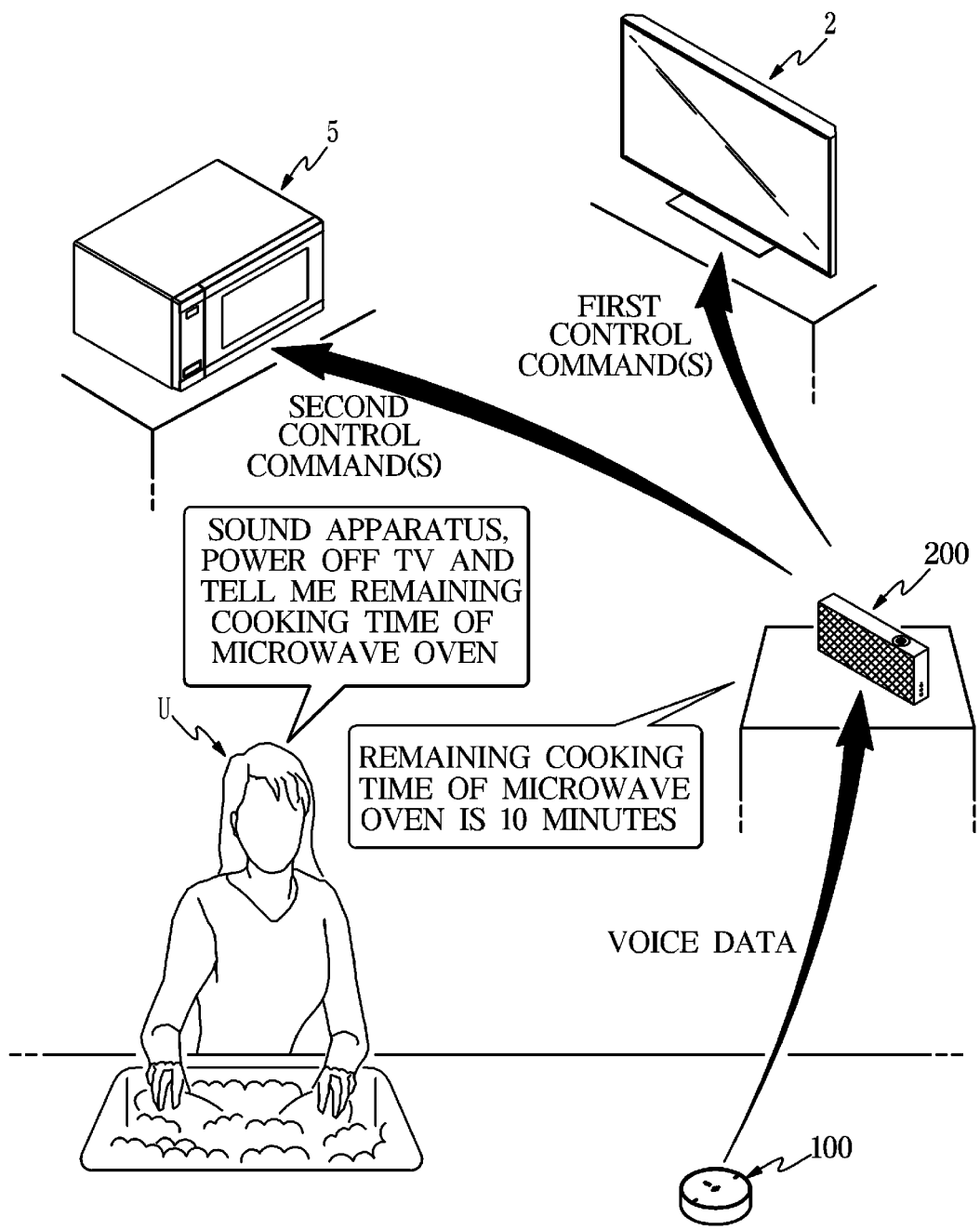
FIG. 20 is a diagram illustrating an example in which the sound output system illustrated in FIG. 18 processes the control command(s)

FIG. 19 is a sequence diagram illustrating an example of the voice recognition operation of the sound output system illustrated in FIG. 18 and FIG. 20 is a diagram illustrating an example in which the sound output system illustrated in FIG. 18 processes the control command(s).

With reference to FIGS. 19 and 20, the voice recognition operation (1300) of the sound output system 1b is described.

The receiving apparatus 100 may receive an input for starting the voice recognition from the user (1310).

The operation 1310 may be the same as or similar to the operation 1010 of FIG. 8. For example, as illustrated in FIG. 20, the user U may utter "sound apparatus" so that the receiving apparatus 100 receives the user voice utterance and the sound apparatus 200 activates the voice recognition. In response to the voice recognition initiation language of the user U ("sound apparatus"), the receiving apparatus 100 may start reception of the user voice utterance.

The receiving apparatus 100 may receive the user voice utterance from the user (1320).

The operation 1320 may be the same as or similar to the operation 1020 of FIG. 8. For example, as illustrated in FIG. 20, after uttering "sound apparatus," which is the voice recognition initiation language, the user U may utter "power off the TV and tell me the remaining cooking time of the microwave oven." The receiving apparatus 100 may receive the user voice utterance "power off the TV and tell me the remaining cooking time of the microwave oven," and convert the user voice utterance into voice data.

The receiving apparatus 100 may transmit the voice data to the sound apparatus 200, and the sound apparatus 200 may receive the voice data from the receiving apparatus 100 (1330).

The operation 1330 may be the same as or similar to the operation 1030, the operation 1040, and the operation 1050 of FIG. 8.

The sound apparatus 200 may recognize the control command(s) based on the user voice utterance from the voice data using the voice recognition (1340).

The sound apparatus 200 may extract the voice feature from the voice data and compare the voice feature with the previously stored voice model. The sound apparatus 200 may determine the meaning of the user voice utterance by comparing the voice feature of the voice data with the voice model.

For example, as illustrated in FIG. 20, the sound apparatus 200 may perform the voice recognition on the voice data indicating "power off the TV and tell me the remaining cooking time of the microwave oven." By the voice recognition, the sound apparatus 200 may determine the control command for turning off the power of the television 2 and the control command for checking the remaining cooking time for the microwave oven 5.

The sound apparatus 200 may transmit the control command(s) recognized by the voice recognition to the electronic devices 2 and 5 (1350 and 1355).

The sound apparatus 200 may determine the first and second control command(s) that can be performed by the electronic devices 2 and 5 among the control command(s) recognized by the voice recognition and may transmit the first and second control command(s) to the electronic devices 2 and 5.

For example, as illustrated in FIG. 19, the sound apparatus 200 may recognize a power off command of the television 2 and a time check command of the microwave oven 5. The sound apparatus 200 may determine that the power off command of the television 2 is the first control command performed by the television 2. The sound apparatus 200 may transmit the power off command of the television 2 to the television 2. In addition, the sound apparatus 200 may determine that the time check command of the microwave oven 5 is the second control command performed by the microwave oven 5. The sound apparatus 200 may transmit the time check command of the microwave oven 5 to the microwave oven 5.

The electronic devices 2 and 5 may operate based on the control command(s) received from the sound apparatus 200 (1360 and 1365).

The electronic devices 2 and 5 may receive the first or second control command(s) from the sound apparatus 200 and may operate based on the first or second control command(s) received from the sound apparatus 200.

For example, as illustrated in FIG. 20, the television 2 may receive the power off command and may be turned off in response to the power off command. Further, the microwave oven 5 may receive the time check command and check the remaining cooking time in response to the time check command.

The electronic devices 2 and 5 may transmit the response signal to the sound apparatus 200 and the sound apparatus 200 may receive the response signal from the electronic devices 2 and 5 (1370 and 1375).

The electronic devices 2 and 5 may transmit the response signal to the sound apparatus 200 including information about the operation result based on the control command(s). For example, as illustrated in FIG. 20, the television 2 may be turned off and transmit the response signal indicating a turn-off state to the sound apparatus 200. Further, the microwave oven 5 may transmit the response signal indicating the remaining cooking time.

The sound apparatus 200 may receive information about the operation result from the electronic devices 2 and 5.

The sound apparatus 200 may output the response according to the response signal of the electronic devices 2 and 5 (1380).

The sound apparatus 200 may output the response to the voice in response to the reception of the response signal of the electronic devices 2 and 5.

For example, as illustrated in FIG. 20, the sound apparatus 200 may synthesize the voice "TV is powered off" in response to the response signal of the television 2, and output the synthesized response voice. Further, the sound apparatus 200 may synthesize the voice "the remaining cooking time of the microwave oven is 10 minutes" in response to the response signal of the microwave oven 5 and output the synthesized response voice.

As described above, the sound output system 1*c* may perform the voice recognition on the user voice utterance. The sound output system 1*c* may transmit the control command(s) to the electronic devices 2 to 5 such that the electronic devices 2 to 5 operate according to the control command(s) recognized by the voice recognition. Also, the sound apparatus 200 may receive the operation result from the electronic devices 2 to 5 and output the voice result of the operation of the electronic devices 2 to 5.

As such, the sound output system 1*c* may transmit the control command(s) by the user voice utterance to the plurality of electronic devices 2 to 5 and may allow the user U to easily control the plurality of electronic devices 2 to 5.

Although the receiving apparatus 100 may receive the user voice utterance and the sound apparatus 200 may perform the voice recognition for the user voice utterance and then transmit the control command to the electronic devices 2 to 5, it is not limited thereto. For example, the receiving apparatus 100 may receive the user voice utterance and then perform the voice recognition on the user voice utterance, and the sound apparatus 200 may transmit the control command to the electronic devices 2 to 5 according to the recognized user voice utterance.

However, the present disclosure is not limited to the above, and the receiving apparatus 100 may receive the user voice utterance and transmit the control command(s) recognized from the user voice utterance to the electronic devices 2 to 5.

Figure 21:
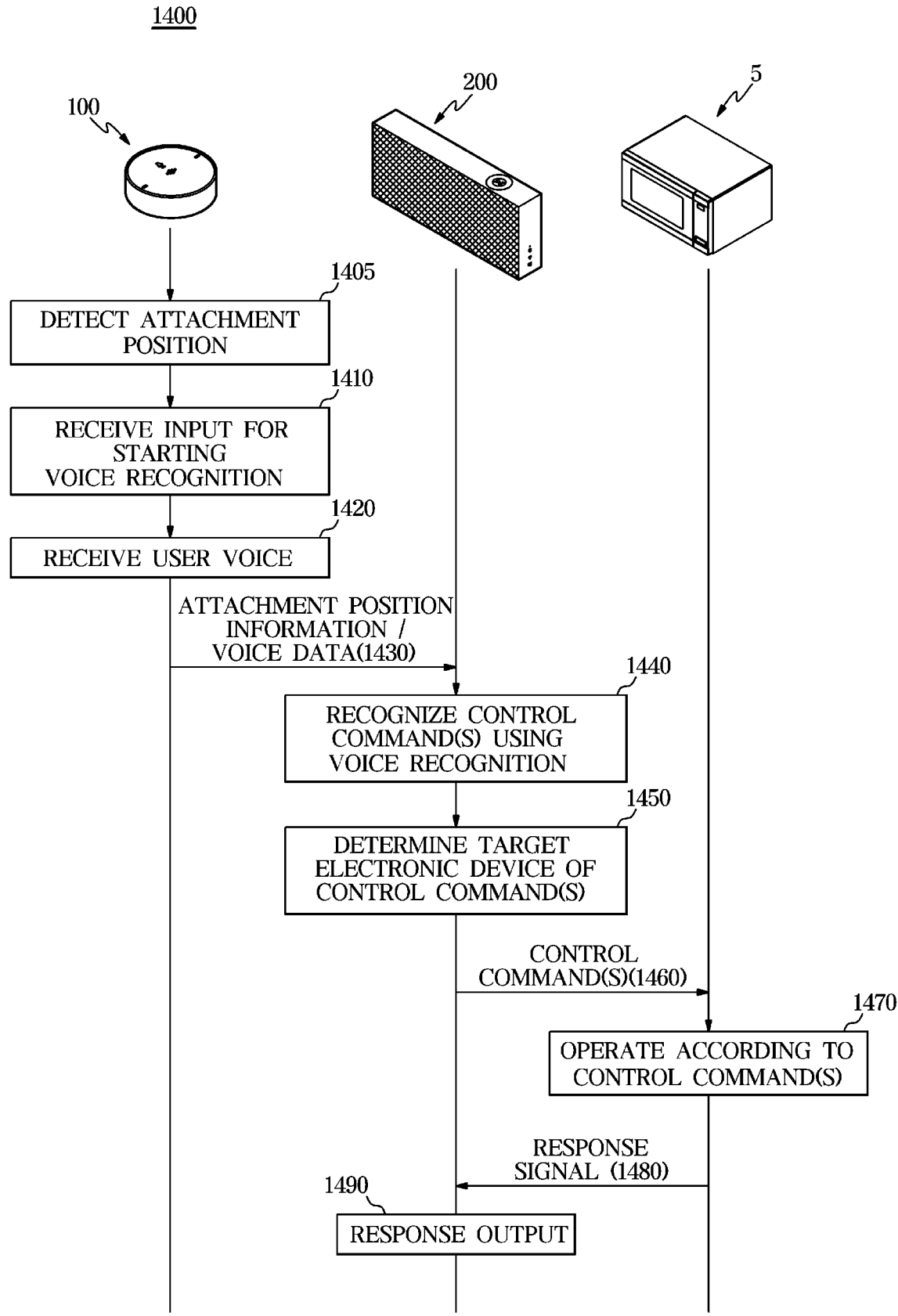
FIG. 21 is a sequence diagram illustrating another example of the voice recognition operation of the sound output system illustrated in FIG. 18.
Figure 22:
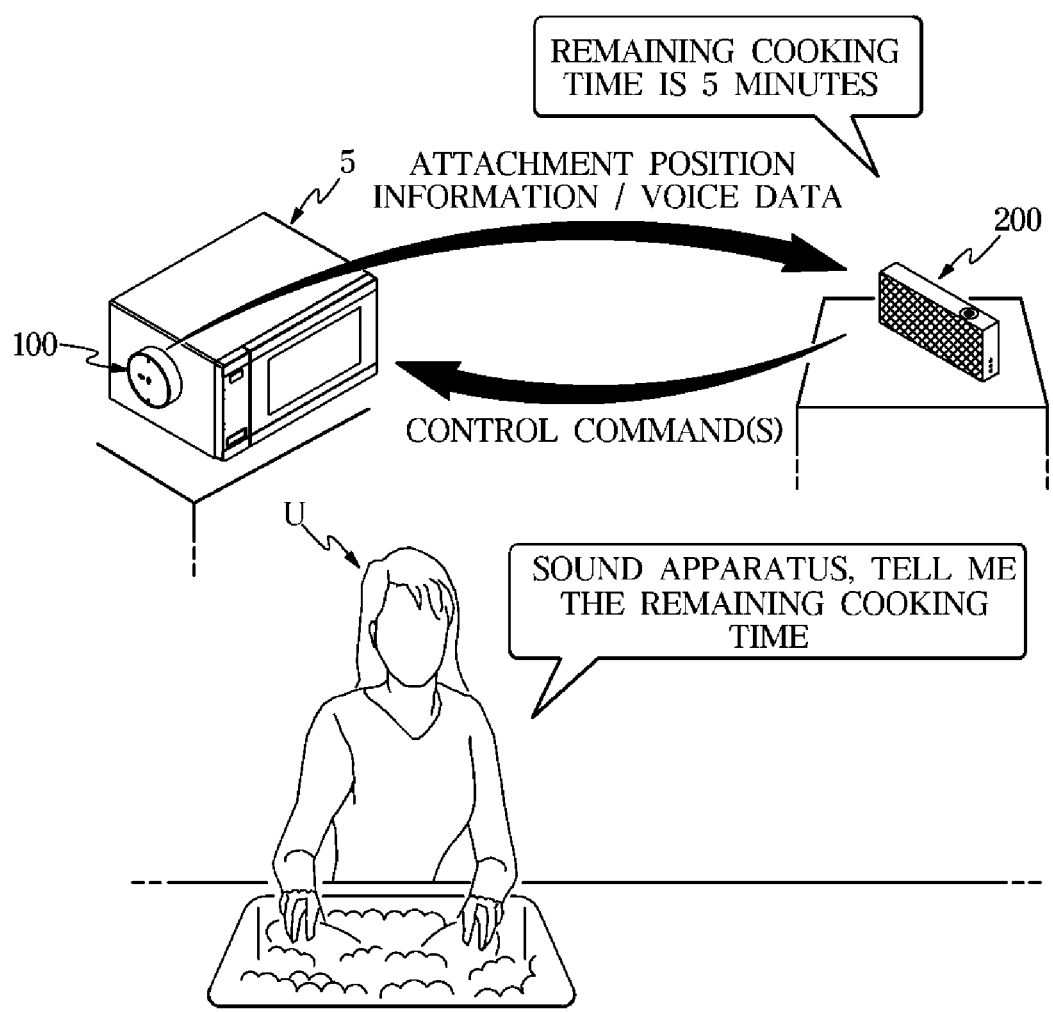
FIG. 22 is a diagram illustrating another example in which the sound output system illustrated in FIG. 18 processes the control command(s).

FIG. 21 is a sequence diagram illustrating another example of the voice recognition operation of the sound output system illustrated in FIG. 18 and FIG. 22 is a diagram illustrating another example in which the sound output system illustrated in FIG. 18 processes the control command(s).

With reference to FIGS. 21 and 22, the voice recognition operation (1400) of the sound output system 1*b* is described.

The receiving apparatus 100 may determine the attachment position of an attached electronic device (1405).

The receiving apparatus 100 may detect the electrical properties and/or magnetic properties of the attached electronic device using the attachment position detector 130 and may identify the electronic device based on the electrical properties and/or magnetic properties of the attached electronic device. For example, the receiving apparatus 100 may determine whether the electronic device to which the receiving apparatus 100 is attached is the television 2, the refrigerator 3, the washing machine 4, or the microwave oven 5.

For example, the attachment position detector 130 may include the electrode 131 that collects the electrical properties of the electronic device to which the receiving apparatus 100 is attached.

The electrode 131 may, for example, include the pair of electrodes 131*a* and 131*b* for collecting information for determining the electrical properties of the electronic device to which the receiving apparatus 100 is attached, for example, the electrical conductivity and/or electrical resistance value.

The pair of electrodes 131*a* and 131*b* may contact the electronic device and be connected to the controller 140 when the receiving apparatus 100 is secured to the electronic device. The controller 140 may apply the voltage between the pair of electrodes 131*a* and 131*b*. When the voltage is applied between the pair of electrodes 131*a* and 131*b*, the current may flow through the pair of electrodes 131*a* and 131*b* and the electronic device.

The controller 140 may determine the electrical properties such as the electrical conductivity and/or electrical resistance value of the electronic device based on the current value flowing through the pair of electrodes 131*a* and 131*b* and the electronic device. For example, the controller 140 may identify the electronic device to which the receiving apparatus 100 is attached based on a lookup table stored in the electrical properties of the electronic device.

The controller 140 may store the electrical properties of the attached electronic device and transmit the electrical properties of the attached electronic device to the sound apparatus 200 as described below.

As another example, the attachment position detector 130 may include the magnetic field sensor 132 that collects the magnetic properties of the electronic device to which the receiving apparatus 100 is attached.

The magnetic field sensor 132 may include the Hall sensor 132a for collecting information to determine whether the magnetic properties of the electronic device to which the receiving apparatus 100 is attached, for example, the magnetic body or the non-magnetic body.

The receiving apparatus 100 may be attached to the electronic device by the magnet, and when the electronic device is a magnetic body, the magnetic field is formed in the electronic device by the magnetic field of the magnet, and the Hall sensor 132a may detect the magnetic field formed in the electronic device. On the other hand, when the electronic device is a non-magnetic body, the magnetic field is not formed in the electronic device, and the Hall sensor 132a may not detect the magnetic field. The Hall sensor 132a may transmit the detection result of the magnetic field to the controller 140.

The controller 140 may determine the magnetic properties of the electronic device based on the signal from the Hall sensor 132a. For example, the controller 140 may identify the electronic device to which the receiving apparatus 100 is attached based on the lookup table stored with the magnetic properties of the electronic device.

However, the present disclosure is not limited thereto. The controller 140 may store the magnetic properties of the attached electronic device and transmit the magnetic properties of the attached electronic device to the sound apparatus 200 as described below.

When the receiving apparatus 100 is attached to the side wall of the microwave oven 5 as illustrated, for example, in FIG. 22, the attachment position detector 130 may collect the electrical properties and/or magnetic properties of the side walls of the microwave oven 5 and may transmit the electrical properties and/or magnetic properties of the sidewall of the microwave oven 5 to the controller 140. The controller 140 may compare the electrical properties and/or magnetic properties of the side walls of the microwave oven 5 with the electrical properties and/or magnetic properties stored in the lookup table to determine whether the electronic device with the receiving apparatus 100 is attached to the microwave oven 5.

The receiving apparatus 100 may receive an input for starting the voice recognition from the user (1410).

The operation 1410 may be the same as or similar to the operation 1010 of FIG. 8. For example, as illustrated in FIG. 22, the user U may utter "sound apparatus" so that the receiving apparatus 100 receives the user voice utterance and the sound apparatus 200 activates the voice recognition. In response to the voice recognition initiation language of the user U ("sound apparatus"), the receiving apparatus 100 may start reception of the user voice utterance.

The receiving apparatus 100 may receive the user voice utterance from the user (1420).

The operation 1420 may be the same as or similar to the operation 1020 of FIG. 8. For example, as illustrated in FIG. 22, after uttering "sound apparatus," which is the voice recognition initiation language, the user U may utter "tell me the remaining cooking time." The receiving apparatus 100 may receive the user voice utterance "tell me the remaining cooking time," and convert the user voice utterance into voice data.

The receiving apparatus 100 may transmit information about the electronic device to which the receiving apparatus 100 is attached and the voice data, and the sound apparatus 200 may receive information about the electronic device to which the receiving apparatus 100 is attached and the voice data (1430).

Information about the attached electronic device may include, for example, and without limitation, identification information of the microwave oven 5, the electrical properties/magnetic properties of the microwave oven 5, or the like.

The sound apparatus 200 may recognize the control command(s) based on the user voice utterance from the voice data using the voice recognition (1440).

The sound apparatus 200 may extract the voice feature from the voice data and compare the voice feature with the previously stored voice model. The sound apparatus 200 may determine the meaning of the user voice utterance by comparing the voice feature of the voice data with the voice model.

For example, as illustrated in FIG. 22, the sound apparatus 200 may perform the voice recognition on the voice data indicating "tell me the remaining cooking time." By the voice recognition, the sound apparatus 200 may determine and check the remaining cooking time.

The sound apparatus 200 may determine the target electronic devices 2 to 5 of the control command(s) based on the information about the electronic device to which the receiving apparatus 100 is attached (1450).

The receiving apparatus 100 may collect the electrical properties and/or magnetic properties of the electronic device to which the receiving apparatus 100 is attached and then identify the attached electronic device based on the electrical properties and/or magnetic properties of the attached electronic device. The receiving apparatus 100 may transmit the identification information of the electronic device to which the receiving apparatus 100 is attached to the sound apparatus 200. When the receiving apparatus 100 receives the identification information of the attached electronic device, the sound apparatus 200 may determine the target electronic devices 2 to 5 of the control command(s) based on the identification information of the electronic device.

The receiving apparatus 100 may also collect the electrical properties and/or magnetic properties of the electronic device to which the receiving apparatus 100 is attached and then transmit the electrical properties and/or magnetic properties of the electronic device to the sound apparatus 200. When the electrical properties and/or magnetic properties of the electronic device are received, the sound apparatus 200 may identify the electronic device to which the receiving apparatus 100 is attached based on, for example, the look up table in which the electrical properties and/or magnetic properties of the electronic device are stored and may determine the target electronic devices 2 to 5 of the user command.

For example, as illustrated in FIG. 22, the sound apparatus 200 may determine the target electronic device of the control command(s) as the microwave oven 5 based on the identification information of the microwave oven 5 transmitted from the receiving apparatus 100 or the electrical properties/magnetic properties of the microwave oven 5.

The sound apparatus 200 may transmit the control command(s) to the target electronic devices 2 to 5 of the control command(s) (1460).

The controller 240 may transmit the control command(s) recognized from the voice data to the target electronic devices 2 to 5 through the communicator 220.

The electronic devices 2 to 5 may operate according to the control command(s) received from the sound apparatus 200 (1470).

The operation 1470 may be same as or similar to the operations 1360 and 1365 illustrated in FIG. 19. For example, as illustrated in FIG. 22, the microwave oven 5 may receive the time check command, and may check the remaining cooking time in response to the time check command.

The electronic devices 2 to 5 may transmit the response signal to the sound apparatus 200 and the sound apparatus 200 may receive the response signal from the electronic devices 2 to 5 (1480).

The operation 1480 may be same as or similar to the operations 1370 and 1375 illustrated in FIG. 10. For example, as illustrated in FIG. 22, the microwave oven 5 may transmit the response signal indicating the remaining cooking time.

The sound apparatus 200 may output the response according to the response signal of the electronic devices 2 to 5 (1490).

The operation 1490 may be same as or similar to the operation 1380 illustrated in FIG. 19. For example, as illustrated in FIG. 22, the sound apparatus 200 may synthesize the voice "the remaining cooking time of the microwave oven is 5 minutes" in response to the response signal of the microwave oven 5 and output the synthesized response voice.

As described above, the sound output system 1c may identify the electronic device to which the receiving apparatus 100 is attached, and may perform the voice recognition on the user voice utterance. The sound output system 1c may transmit the control command(s) to the electronic devices 2 to 5 to which the receiving apparatus 100 is attached so that the electronic devices 2 to 5 to which the receiving apparatus 100 is attached operate according to the control command(s) recognized by the voice recognition. Also, the sound apparatus 200 may receive the operation result from the electronic devices 2 to 5 and output the operation result of the electronic devices 2 to 5.

As such, the sound output system 1c may transmit the control command(s) based on the user voice utterance to the electronic device to which the receiving apparatus 100 is attached and may allow the user U to easily set the control target.

In the above description, the receiving apparatus 100 may detect the attachment position, receive the user voice utterance, perform the voice recognition on the user voice utterance, and then transmit the electronic devices 2 to 5 determined from the attachment position of the receiving apparatus 100, but the present disclosure is not limited to this. For example, the receiving apparatus 100 may determine the electronic devices 2 to 5 to which the receiving apparatus 100 is attached and perform the voice recognition on the user voice utterance and then generate the control command(s) according to the determination result of the electronic devices 2 to 5 to which the receiving apparatus 100 is attached and the voice recognition result. In addition, the sound apparatus 200 may transmit the control command received from the receiving apparatus 100 to the corresponding electronic devices 2 to 5.

As is apparent from the above description, an example aspect of the present disclosure may provide the sound output system including the receiving apparatus provided separately from the sound apparatus for performing the voice recognition.

Further, another example aspect of the present disclosure may provide the sound output system capable of performing the voice recognition using the user apparatus having the high-performance processor or the conversation service server.

Further, another example aspect of the present disclosure may provide the sound output system capable of performing the plurality of operations according to the user voice utterance.

Further, another example aspect of the present disclosure may provide the sound output system capable of controlling the plurality of electronic devices according to the user voice utterance.

Further, another example aspect of the present disclosure may provide the sound output system capable of controlling other electronic devices according to the position of the receiving apparatus that receives the user voice utterance.

Further, according to yet another example aspect of the present disclosure, the sound apparatus 200 and the receiving apparatus 100 may be formed integrally into a single device or apparatus.

Although various example embodiments of the present disclosure have been described for illustrative purposes, those skilled in the art will appreciate that various modifications, additions and substitutions are possible, without departing from the scope and spirit of the disclosure. Therefore, the various example embodiments of the present disclosure are intended to be illustrative, not limiting.

Example embodiments of the present disclosure have been described above. In the example embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described example embodiments, embodiments can thus be implemented through computer readable code/instructions in/on a medium, e.g., a computer readable medium, to control at least one processing element to implement any above described example embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD- ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While example embodiments have been described with respect to a limited number of embodiments, those skilled in the art, having the benefit of this disclosure, will appreciate that other embodiments can be devised which do not depart from the scope as disclosed herein.

What is claimed is:

1. A sound output system comprising:
   a receiving apparatus comprising receiving circuitry configured to receive a user input; and
   a sound apparatus comprising circuitry configured to receive the user input from the receiving apparatus and to perform an operation in response to the user input received from the receiving apparatus,
   wherein the sound apparatus comprises:
   a sound outputter comprising sound output circuitry;
   a first communicator comprising communication circuitry configured to communicate with the receiving apparatus; and
   a controller configured to control the sound apparatus to perform the operation based on the user input received from the receiving apparatus through the first communicator, and
   wherein the receiving apparatus is removably attachable to the sound apparatus, and the sound apparatus is configured to perform different operations based on different attachment positons of the receiving apparatus relative to the sound apparatus, in response to a same user input.

2. The sound output system according to claim 1, wherein the user input comprises a voice command,
   wherein the receiving apparatus is configured to transmit the voice command to the sound apparatus, and
   wherein the controller is configured to recognize the voice command received from the receiving apparatus and to control the sound apparatus to perform the operation based on the recognized voice command.

3. The sound output system according to claim 2, wherein the sound apparatus further comprises:
   a second communicator comprising communication circuitry configured to communicate with a user apparatus, and
   wherein the controller is configured to control the second communicator to transmit the voice command to the user apparatus and to receive the voice command recognized by the user apparatus from the user apparatus through the second communicator.

4. The sound output system according to claim 2, wherein the sound apparatus further comprises:
   a second communicator comprising communication circuitry configured to communicate with a plurality of electronic devices, and
   wherein the controller is configured to control the second communicator to transmit the recognized voice command to at least one of the plurality of electronic devices.

5. The sound output system according to claim 2, wherein the sound apparatus further comprises:
   a second communicator comprising communication circuitry configured to communicate with a plurality of electronic devices, and
   wherein the controller is configured to receive the voice command and information about the electronic device to which the receiving apparatus is attached through the first communicator and to transmit the recognized voice command to the electronic device to which the receiving apparatus is attached through the second communicator.

6. The sound output system according to claim 5, wherein the information about the electronic device to which the receiving apparatus is attached includes electrical properties and/or magnetic properties of the electronic device, and
   wherein the controller is configured to identify the electronic device to which the receiving apparatus is attached by comparing the electrical properties and/or magnetic properties of the electronic device with electrical properties and/or magnetic properties previously stored in a memory.

7. The sound output system according to claim 1, wherein the user input comprises a plurality of voice commands,
   wherein the receiving apparatus is configured to transmit the plurality of voice commands to the sound apparatus, and
   wherein the controller is configured to recognize the plurality of voice commands received through the first communicator and to control the sound apparatus to perform a plurality of operations based on the recognized plurality of voice commands.

8. The sound output system according to claim 1, wherein the user input comprises a voice command,
   wherein the receiving apparatus is configured to transmit the voice command to a user apparatus, to receive the voice command recognized by the user apparatus from the user apparatus, and to transmit the recognized voice command to the sound apparatus, and
   wherein the controller is configured to control the sound apparatus to perform the operation based on the voice command received from the receiving apparatus.

9. A voice processing method comprising:
   receiving, by a receiving apparatus, a user input; and
   performing, by a sound apparatus, an operation in response to the user input received by the receiving apparatus,
   wherein the receiving apparatus is removably attachable to the sound apparatus, and
   the performing of the operation comprises performing different operations based on different attachment positions of the receiving apparatus relative to the sound apparatus, in response to a same user input.

10. The method according to claim 9, wherein the user input comprises a voice command, and
    wherein the performing of the operation comprises:
    receiving, by the sound apparatus, the voice command from the receiving apparatus;
    recognizing the voice command received from the receiving apparatus; and
    performing the operation based on the recognized voice command.

11. The method according to claim 10, wherein the performing of the operation comprises:
    transmitting, by the sound apparatus, the voice command to a user apparatus; and
    performing the operation in response to the voice command recognized by the user apparatus.

12. The method according to claim 10, wherein the performing of the operation comprises:
transmitting, by the sound apparatus, the recognized voice command to at least one of a plurality of electronic devices.

13. The method according to claim 10, wherein the performing of the operation comprises:
receiving, by the sound apparatus, information about an electronic device to which the receiving apparatus is attached and the voice command; and
transmitting the recognized voice command to the electronic device to which the receiving apparatus is attached.

14. The method according to claim 13, wherein the information about the electronic device to which the receiving apparatus is attached includes electrical properties and/or magnetic properties of the electronic device, and
the method further comprises:
identifying, by the sound apparatus, the electronic device to which the receiving apparatus is attached by comparing the electrical properties and/or magnetic properties of the electronic device with the electrical properties and/or magnetic properties previously stored in a memory.

15. The method according to claim 9, wherein the user input comprises a plurality of voice commands, and
wherein the performing of the operation comprises:
receiving, by the sound apparatus, the plurality of voice commands from the receiving apparatus;
recognizing the plurality of voice commands received from the receiving apparatus; and
performing operations based on the recognized plurality of voice commands.

16. The method according to claim 9, wherein the user input comprises a plurality of voice commands, and
the method further comprises:
transmitting, by the receiving apparatus, the voice command to a user apparatus;
receiving the voice command recognized by the user apparatus from the user apparatus;
transmitting the recognized voice command to the sound apparatus; and
performing, by the sound apparatus, the operation based on the voice command received from the receiving apparatus.

17. A sound output system comprising:
a receiving apparatus comprising receiving circuitry configured to receive a user voice command; and
a sound apparatus comprising circuitry configured to receive the user voice command from the receiving apparatus and to operate based on the user voice command received from the receiving apparatus,
wherein the receiving apparatus comprises:
a microphone configured to receive the user voice command;
a communicator comprising communication circuitry configured to communicate with the receiving apparatus;
an attachment position detector comprising detecting circuitry configured to collect information about a positon to which the receiving apparatus is attached relative to the sound apparatus; and
a controller configured to control the communicator to transmit the information about the position to which the receiving apparatus is attached and the user voice command to the sound apparatus.

18. The sound output system according to claim 17, wherein the information about the position comprises at least one of electrical properties and magnetic properties of the position to which the receiving apparatus is attached.

19. The sound output system according to claim 17, wherein the attachment position detector is configured to detect electrical properties and/or magnetic properties of the position to which the receiving apparatus is attached, and
wherein the controller is configured to identify the position to which the receiving apparatus is attached by comparing the electrical properties and/or magnetic properties with the electrical properties and/or magnetic properties previously stored in a memory.

20. The sound output system according to claim 17, wherein the sound apparatus is configured to perform different operations in response to the same user voice command based on different attachment positions to which the receiving apparatus is attached.

* * * * *